(12) United States Patent
Osawa et al.

(10) Patent No.: US 11,958,494 B2
(45) Date of Patent: Apr. 16, 2024

(54) INFORMATION COLLECTION DEVICE AND INFORMATION COLLECTION METHOD

(71) Applicant: Mitsubishi Electric Corporation, Tokyo (JP)

(72) Inventors: Masanobu Osawa, Tokyo (JP); Daisuke Fushiki, Tokyo (JP); Takuji Morimoto, Tokyo (JP); Takumi Sato, Tokyo (JP); Hiroyoshi Shibata, Tokyo (JP); Tetsuro Nishioka, Tokyo (JP); Mizuki Higuchi, Tokyo (JP); Shogo Okamoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 455 days.

(21) Appl. No.: 17/048,777

(22) PCT Filed: Jun. 18, 2018

(86) PCT No.: PCT/JP2018/023135
§ 371 (c)(1),
(2) Date: Oct. 19, 2020

(87) PCT Pub. No.: WO2019/244210
PCT Pub. Date: Dec. 26, 2019

(65) Prior Publication Data
US 2021/0146946 A1   May 20, 2021

(51) Int. Cl.
*B60W 50/14*   (2020.01)
*B60K 35/00*   (2006.01)
*G08G 1/0967*  (2006.01)

(52) U.S. Cl.
CPC .............. *B60W 50/14* (2013.01); *B60K 35/00* (2013.01); *G08G 1/096716* (2013.01); *B60W 2050/146* (2013.01)

(58) Field of Classification Search
CPC . B60W 50/14; B60W 2050/146; B60K 35/00; G08G 1/096716; G06Q 50/30; G06Q 10/20
See application file for complete search history.

(56) References Cited

U.S. PATENT DOCUMENTS

2016/0292881 A1* 10/2016 Bose ...................... G11B 27/10
2017/0024393 A1    1/2017 Choksi et al.
(Continued)

FOREIGN PATENT DOCUMENTS

DE   10 2016 125 649 A1   11/2017
JP        10-248084 A      9/1998
(Continued)

OTHER PUBLICATIONS

Communication dated Apr. 5, 2022 from the German Patent Office in German Application No. 11 2018 007 622.9.
(Continued)

*Primary Examiner* — James J Lee
*Assistant Examiner* — Clint Pham
(74) *Attorney, Agent, or Firm* — Sughrue Mion, PLLC; Richard C. Turner

(57) ABSTRACT

An acquisition unit acquires pieces of information including information related to a vehicle, information related to the environment inside and outside the vehicle, and information related to a driver on board the vehicle. A determination unit determines priorities of the pieces of information acquired by the acquisition unit on the basis of a service or the like used by the driver among services or the likes provided using information accumulated in a server device. A selection unit selects a piece of information to be transmitted to the server device from among the pieces of information acquired by the acquisition unit on the basis of the priorities determined by the determination unit. A communication unit
(Continued)

transmits the piece of information selected by the selection unit to the server device.

9 Claims, 22 Drawing Sheets

(56) References Cited

U.S. PATENT DOCUMENTS

| | | |
|---|---|---|
| 2017/0336920 A1 | 11/2017 | Chan et al. |
| 2018/0127001 A1* | 5/2018 | Ricci .................... B60W 50/14 |
| 2019/0130740 A1 | 5/2019 | Wakisaka et al. |
| 2019/0182275 A1 | 6/2019 | Ando et al. |

FOREIGN PATENT DOCUMENTS

| | | | |
|---|---|---|---|
| JP | 2015-179445 A | 10/2015 | |
| JP | 2018-32254 A | 3/2018 | |
| WO | 2017/199287 A1 | 11/2017 | |
| WO | 2018/037708 A1 | 3/2018 | |

OTHER PUBLICATIONS

International Stage Entry of PCT/JP2018/023135 dated Aug. 28, 2018 [PCT/ISA/210].
Written Opinion of PCT/JP2018/023135 dated Aug. 28, 2018 [PCT/ISA/210.
Communication dated Sep. 24, 2023, issued in Chinese Application No. 201880094425.X.

* cited by examiner

| Service | Service ID |
|---|---|
| Dangerous Spot Information Providing | 01 |
| Insurance Premium Calculation | 02 |
| Car Diagnosis | 03 |
| ... | ... |

FIG. 4

| Information Type | Priority |
|---|---|
| Host Vehicle Position | 0 |
| Speed | 0 |
| Acceleration | 0 |
| Steering Angle | 0 |
| Brake Information | 0 |
| Uneven Spot Information | 0 |
| Sudden Deceleration Spot Information | 0 |
| Sudden Steering Spot Information | 0 |
| Sudden Acceleration Spot Information | 0 |
| Wiper Information | 0 |
| Brake Oil Pressure | 0 |
| Battery Voltage | 0 |
| Temperature of Coolant | 0 |
| Image Capturing Outside of Vehicle | 0 |
| Uttered Speech | 0 |
| Uttered Speech Recognition Result | 0 |
| Heart Rate | 0 |
| Drowsiness Degree | 0 |
| Inattentiveness Information | 0 |
| Number of Occupants | 0 |
| Image Capturing Inside of Vehicle | 0 |
| Temperature Inside Vehicle | 0 |
| ... | ... |

FIG. 5

| Information Type | Service ID | | | |
| --- | --- | --- | --- | --- |
| | 01 (Dangerous Spot Information Providing) | 02 (Insurance Premium Calculation) | 03 (Car Diagnosis) | ... |
| Host Vehicle Position | 1 | 1 | 0 | ... |
| Speed | 1 | 1 | 0 | ... |
| Acceleration | 1 | 1 | 0 | ... |
| Steering Angle | 1 | 1 | 0 | ... |
| Brake Information | 1 | 1 | 0 | ... |
| Uneven Spot Information | 1 | 0 | 0 | ... |
| Sudden Deceleration Spot Information | 1 | 1 | 0 | ... |
| Sudden Steering Spot Information | 1 | 1 | 0 | ... |
| Sudden Acceleration Spot Information | 0 | 1 | 0 | ... |
| Wiper Information | 0 | 0 | 1 | ... |
| Brake Oil Pressure | 0 | 0 | 1 | ... |
| Battery Voltage | 0 | 0 | 1 | ... |
| Temperature of Coolant | 0 | 0 | 1 | ... |
| Image Capturing Outside of Vehicle | 1 | 0 | 0 | ... |
| Uttered Speech | 1 | 0 | 0 | ... |
| Uttered Speech Recognition Result | 1 | 0 | 0 | ... |
| Heart Rate | 0 | 1 | 0 | ... |
| Drowsiness Degree | 0 | 1 | 0 | ... |
| Inattentiveness Information | 0 | 1 | 0 | ... |
| Number of Occupants | 0 | 0 | 0 | ... |
| Image Capturing Inside of Vehicle | 0 | 0 | 0 | ... |
| Temperature Inside Vehicle | 0 | 0 | 0 | ... |
| ... | ... | ... | ... | ... |

FIG. 6

| Information Type | Priority |
|---|---|
| Host Vehicle Position | 1 |
| Speed | 1 |
| Acceleration | 1 |
| Steering Angle | 1 |
| Brake Information | 1 |
| Uneven Spot Information | 1 |
| Sudden Deceleration Spot Information | 1 |
| Sudden Steering Spot Information | 1 |
| Sudden Acceleration Spot Information | 0 |
| Wiper Information | 0 |
| Brake Oil Pressure | 0 |
| Battery Voltage | 0 |
| Temperature of Coolant | 0 |
| Image Capturing Outside of Vehicle | 1 |
| Uttered Speech | 1 |
| Uttered Speech Recognition Result | 1 |
| Heart Rate | 0 |
| Drowsiness Degree | 0 |
| Inattentiveness Information | 0 |
| Number of Occupants | 0 |
| Image Capturing Inside of Vehicle | 0 |
| Temperature Inside Vehicle | 0 |
| ... | ... |

FIG. 7

| Information Type | Priority |
|---|---|
| Host Vehicle Position | 1 |
| Speed | 1 |
| Acceleration | 1 |
| Steering Angle | 1 |
| Brake Information | 1 |
| Uneven Spot Information | 1 |
| Sudden Deceleration Spot Information | 1 |
| Sudden Steering Spot Information | 1 |
| Sudden Acceleration Spot Information | 1 |
| Wiper Information | 1 |
| Brake Oil Pressure | 1 |
| Battery Voltage | 1 |
| Temperature of Coolant | 1 |
| Image Capturing Outside of Vehicle | 1 |
| Uttered Speech | 1 |
| Uttered Speech Recognition Result | 1 |
| Heart Rate | 1 |
| Drowsiness Degree | 1 |
| Inattentiveness Information | 1 |
| Number of Occupants | 0 |
| Image Capturing Inside of Vehicle | 0 |
| Temperature Inside Vehicle | 0 |
| ... | ... |

FIG. 8

| Information Type | Service ID | | | |
| --- | --- | --- | --- | --- |
| | 01 (Dangerous Spot Information Providing) | 02 (Insurance Premium Calculation) | 03 (Car Diagnosis) | ... |
| Host Vehicle Position | 1 | 2 | 0 | ... |
| Speed | 1 | 2 | 0 | ... |
| Acceleration | 1 | 2 | 0 | ... |
| Steering Angle | 1 | 2 | 0 | ... |
| Brake Information | 1 | 2 | 0 | ... |
| Uneven Spot Information | 1 | 0 | 0 | ... |
| Sudden Deceleration Spot Information | 1 | 2 | 0 | ... |
| Sudden Steering Spot Information | 1 | 2 | 0 | ... |
| Sudden Acceleration Spot Information | 0 | 2 | 0 | ... |
| Wiper Information | 0 | 0 | 2 | ... |
| Brake Oil Pressure | 0 | 0 | 2 | ... |
| Battery Voltage | 0 | 0 | 2 | ... |
| Temperature of Coolant | 0 | 0 | 2 | ... |
| Image Capturing Outside of Vehicle | 1 | 0 | 0 | ... |
| Uttered Speech | 1 | 0 | 0 | ... |
| Uttered Speech Recognition Result | 1 | 0 | 0 | ... |
| Heart Rate | 0 | 2 | 0 | ... |
| Drowsiness Degree | 0 | 2 | 0 | ... |
| Inattentiveness Information | 0 | 2 | 0 | ... |
| Number of Occupants | 0 | 0 | 0 | ... |
| Image Capturing Inside of Vehicle | 0 | 0 | 0 | ... |
| Temperature Inside Vehicle | 0 | 0 | 0 | ... |
| ... | ... | ... | ... | ... |

FIG. 9

| Information Type | Priority |
|---|---|
| Host Vehicle Position | 2 |
| Speed | 2 |
| Acceleration | 2 |
| Steering Angle | 2 |
| Brake Information | 2 |
| Uneven Spot Information | 1 |
| Sudden Deceleration Spot Information | 2 |
| Sudden Steering Spot Information | 2 |
| Sudden Acceleration Spot Information | 2 |
| Wiper Information | 2 |
| Brake Oil Pressure | 2 |
| Battery Voltage | 2 |
| Temperature of Coolant | 2 |
| Image Capturing Outside of Vehicle | 1 |
| Uttered Speech | 1 |
| Uttered Speech Recognition Result | 1 |
| Heart Rate | 2 |
| Drowsiness Degree | 2 |
| Inattentiveness Information | 2 |
| Number of Occupants | 0 |
| Image Capturing Inside of Vehicle | 0 |
| Temperature Inside Vehicle | 0 |
| ... | ... |

FIG. 10

| Information Type | Service ID | | | |
| --- | --- | --- | --- | --- |
| | 01 (Dangerous Spot Information Providing) | 02 (Insurance Premium Calculation) | 03 (Car Diagnosis) | ... |
| Host Vehicle Position | 1 | 1 | 0 | ... |
| Speed | 1 | 1 | 0 | ... |
| Acceleration | 1 | 1 | 0 | ... |
| Steering Angle | 1 | 1 | 0 | ... |
| Brake Information | 1 | 1 | 0 | ... |
| Uneven Spot Information | 2 | 0 | 0 | ... |
| Sudden Deceleration Spot Information | 2 | 2 | 0 | ... |
| Sudden Steering Spot Information | 2 | 2 | 0 | ... |
| Sudden Acceleration Spot Information | 0 | 2 | 0 | ... |
| Wiper Information | 0 | 0 | 2 | ... |
| Brake Oil Pressure | 0 | 0 | 2 | ... |
| Battery Voltage | 0 | 0 | 2 | ... |
| Temperature of Coolant | 0 | 0 | 2 | ... |
| Image Capturing Outside of Vehicle | 1 | 0 | 0 | ... |
| Uttered Speech | 1 | 0 | 0 | ... |
| Uttered Speech Recognition Result | 1 | 0 | 0 | ... |
| Heart Rate | 0 | 1 | 0 | ... |
| Drowsiness Degree | 0 | 1 | 0 | ... |
| Inattentiveness Information | 0 | 1 | 0 | ... |
| Number of Occupants | 0 | 0 | 0 | ... |
| Image Capturing Inside of Vehicle | 0 | 0 | 0 | ... |
| Temperature Inside Vehicle | 0 | 0 | 0 | ... |
| ... | ... | ... | ... | ... |

FIG. 11

| Information Type | Priority |
|---|---|
| Host Vehicle Position | 1 |
| Speed | 1 |
| Acceleration | 1 |
| Steering Angle | 1 |
| Brake Information | 1 |
| Uneven Spot Information | 2 |
| Sudden Deceleration Spot Information | 2 |
| Sudden Steering Spot Information | 2 |
| Sudden Acceleration Spot Information | 2 |
| Wiper Information | 2 |
| Brake Oil Pressure | 2 |
| Battery Voltage | 2 |
| Temperature of Coolant | 2 |
| Image Capturing Outside of Vehicle | 1 |
| Uttered Speech | 1 |
| Uttered Speech Recognition Result | 1 |
| Heart Rate | 1 |
| Drowsiness Degree | 1 |
| Inattentiveness Information | 1 |
| Number of Occupants | 0 |
| Image Capturing Inside of Vehicle | 0 |
| Temperature Inside Vehicle | 0 |
| ... | ... |

FIG. 12

| Information Type | Service ID | | | |
| --- | --- | --- | --- | --- |
| | 01 (Dangerous Spot Information Providing) | 02 (Insurance Premium Calculation) | 03 (Car Diagnosis) | ... |
| Host Vehicle Position | 1 | 1 | 0 | ... |
| Speed | 1 | 1 | 0 | ... |
| Acceleration | 1 | 1 | 0 | ... |
| Steering Angle | 1 | 1 | 0 | ... |
| Brake Information | 1 | 1 | 0 | ... |
| Uneven Spot Information | 2 | 0 | 0 | ... |
| Sudden Deceleration Spot Information | 2 | 2 | 0 | ... |
| Sudden Steering Spot Information | 2 | 2 | 0 | ... |
| Sudden Acceleration Spot Information | 0 | 2 | 0 | ... |
| Wiper Information | 0 | 0 | 2 | ... |
| Brake Oil Pressure | 0 | 0 | 2 | ... |
| Battery Voltage | 0 | 0 | 2 | ... |
| Temperature of Coolant | 0 | 0 | 2 | ... |
| Image Capturing Outside of Vehicle | 1 | 0 | 0 | ... |
| Uttered Speech | 1 | 0 | 0 | ... |
| Uttered Speech Recognition Result | 2 | 0 | 0 | ... |
| Heart Rate | 0 | 1 | 0 | ... |
| Drowsiness Degree | 0 | 2 | 0 | ... |
| Inattentiveness Information | 0 | 2 | 0 | ... |
| Number of Occupants | 0 | 0 | 0 | ... |
| Image Capturing Inside of Vehicle | 0 | 0 | 0 | ... |
| Temperature Inside Vehicle | 0 | 0 | 0 | ... |
| ... | ... | ... | ... | ... |

FIG. 13

| Information Type | Priority |
|---|---|
| Host Vehicle Position | 1 |
| Speed | 1 |
| Acceleration | 1 |
| Steering Angle | 1 |
| Brake Information | 1 |
| Uneven Spot Information | 2 |
| Sudden Deceleration Spot Information | 2 |
| Sudden Steering Spot Information | 2 |
| Sudden Acceleration Spot Information | 2 |
| Wiper Information | 2 |
| Brake Oil Pressure | 2 |
| Battery Voltage | 2 |
| Temperature of Coolant | 2 |
| Image Capturing Outside of Vehicle | 1 |
| Uttered Speech | 1 |
| Uttered Speech Recognition Result | 2 |
| Heart Rate | 1 |
| Drowsiness Degree | 2 |
| Inattentiveness Information | 2 |
| Number of Occupants | 0 |
| Image Capturing Inside of Vehicle | 0 |
| Temperature Inside Vehicle | 0 |
| ... | ... |

FIG. 14

| Service Registration | Registered | | | |
|---|---|---|---|---|
| Sharing of Provided Information with Other Vehicles | Not Shared | | Shared | |
| Service Operation | Necessary | Not Necessary | Necessary | Not Necessary |
| Priority | 4 | 3 | 2 | 1 |

FIG. 15

| Information Type | Service ID | | | |
|---|---|---|---|---|
| | 01 (Dangerous Spot Information Providing) | 02 (Insurance Premium Calculation) | 03 (Car Diagnosis) | ... |
| Host Vehicle Position | 1 | 3 | 0 | ... |
| Speed | 1 | 3 | 0 | ... |
| Acceleration | 1 | 3 | 0 | ... |
| Steering Angle | 1 | 3 | 0 | ... |
| Brake Information | 1 | 3 | 0 | ... |
| Uneven Spot Information | 2 | 0 | 0 | ... |
| Sudden Deceleration Spot Information | 2 | 4 | 0 | ... |
| Sudden Steering Spot Information | 2 | 4 | 0 | ... |
| Sudden Acceleration Spot Information | 0 | 4 | 0 | ... |
| Wiper Information | 0 | 0 | 4 | ... |
| Brake Oil Pressure | 0 | 0 | 4 | ... |
| Battery Voltage | 0 | 0 | 4 | ... |
| Temperature of Coolant | 0 | 0 | 4 | ... |
| Image Capturing Outside of Vehicle | 1 | 0 | 0 | ... |
| Uttered Speech | 1 | 0 | 0 | ... |
| Uttered Speech Recognition Result | 1 | 0 | 0 | ... |
| Heart Rate | 0 | 3 | 0 | ... |
| Drowsiness Degree | 0 | 3 | 0 | ... |
| Inattentiveness Information | 0 | 3 | 0 | ... |
| Number of Occupants | 0 | 0 | 0 | ... |
| Image Capturing Inside of Vehicle | 0 | 0 | 0 | ... |
| Temperature Inside Vehicle | 0 | 0 | 0 | ... |
| ... | ... | ... | ... | ... |

FIG. 16

| Information Type | Priority |
|---|---|
| Host Vehicle Position | 3 |
| Speed | 3 |
| Acceleration | 3 |
| Steering Angle | 3 |
| Brake Information | 3 |
| Uneven Spot Information | 2 |
| Sudden Deceleration Spot Information | 4 |
| Sudden Steering Spot Information | 4 |
| Sudden Acceleration Spot Information | 4 |
| Wiper Information | 4 |
| Brake Oil Pressure | 4 |
| Battery Voltage | 4 |
| Temperature of Coolant | 4 |
| Image Capturing Outside of Vehicle | 1 |
| Uttered Speech | 1 |
| Uttered Speech Recognition Result | 1 |
| Heart Rate | 3 |
| Drowsiness Degree | 3 |
| Inattentiveness Information | 3 |
| Number of Occupants | 0 |
| Image Capturing Inside of Vehicle | 0 |
| Temperature Inside Vehicle | 0 |
| ... | ... |

INFORMATION COLLECTION DEVICE AND INFORMATION COLLECTION METHOD

CROSS REFERENCE TO RELATED APPLICATIONS

This application is a National Stage of International Application No. PCT/JP2018/023135 filed Jun. 18, 2018.

TECHNICAL FIELD

The present invention relates to an information collection device, a server device, and an information collection method.

BACKGROUND ART

In recent years, services or functions utilizing a large amount of information have been provided to vehicles. Such information has been collected by sensors or the like mounted on vehicles, transmitted from the vehicles to a server device, and accumulated in the server device.

A large amount of information is collected by sensors or the like mounted on the vehicles and transmitted to the server device. Therefore, for example, a situation occurs where information necessary for provision of services or functions is not delivered to the server device as described below, and thereby the quality of services or functions is deteriorated.

In a situation where a vehicle cannot communicate with the server device, the vehicle needs to store collected information and transmit the stored information to the server device when communication becomes possible. However, information necessary for provision of services or functions is not accumulated depending on the length of communication disabled time since the storage capacity of the vehicle is not large, and as a result, the information is not transmitted to the server device.

With a large amount of information transmitted from a large number of vehicles to the server device in a short time, congestion occurs in the communication path, and as a result, the server device cannot receive information necessary for provision of services or functions.

In a log collection system according to Patent Literature 1, in a case where a server device determines that there is a high possibility that the service being executed by an in-vehicle device is being attacked, the server device instructs the in-vehicle device to preferentially store information necessary for analysis of whether or not the service is actually attacked, and receives the stored information from the in-vehicle device.

CITATION LIST

Patent Literature

Patent Literature 1: WO 2018/037708 A

SUMMARY OF INVENTION

Technical Problem

Since the log collection system described in Patent Literature 1 determines priorities of information to be transmitted by the in-vehicle device on the basis of the type of an attack that may be occurring, there is a disadvantage that information necessary for provision of services or functions cannot be transmitted to the server device in situations as described above. As a result, the quality of services or functions provided is deteriorated.

The present invention has been made to solve the above disadvantage, and an object of the present invention is to select information to be transmitted to a server device without deteriorating the quality of services or functions.

Solution to Problem

An information collection device according to the present invention includes: a processor to execute a program; a memory to store the program which, when executed by the processor, performs processes of, acquiring pieces of information including information related to a vehicle, information related to environment inside and outside the vehicle, and information related to a driver on board the vehicle; determining priorities of the respective pieces of information acquired on the basis of one or more services or functions used by the driver among services or functions provided using information accumulated in a server device; and selecting a piece of information to be transmitted to the server device from among the pieces of information acquired on the basis of the priorities determined; and a communication device to transmit the piece of information selected to the server device.

Advantageous Effects of Invention

According to the present invention, priorities of pieces of information acquired by the acquisition unit are determined on the basis of a service or function used by a driver among services or functions provided using information accumulated in the server device, and a piece of information to be transmitted to the server device is selected from among the pieces of information acquired by the acquisition unit on the basis of the determined priorities. Thus, it is possible to transmit information necessary for provision of the service or function used by the driver to the server device, thereby preventing deterioration of the quality of the service or function.

BRIEF DESCRIPTION OF DRAWINGS

FIG. 4 is a table illustrating an example of a selection table retained by a selection unit of the first embodiment.

FIG. 5 is a table illustrating an example of a priority table retained by a determination unit of the first embodiment, which is an example of priority determination method (1).

FIG. 6 is a table illustrating an example of the selection table of the selection unit updated by the determination unit of the first embodiment.

FIG. 7 is a table illustrating an example of the selection table of the selection unit updated by the determination unit of the first embodiment, which is an example of priority determination method (1).

FIG. 8 is a table illustrating an example of the priority table retained by the determination unit of the first embodiment, which is an example of priority determination method (2).

FIG. 9 is a table illustrating an example of the selection table of the selection unit updated by the determination unit of the first embodiment, which is an example of priority determination method (2).

FIG. 10 is a table illustrating an example of the priority table retained by the determination unit of the first embodiment, which is an example of priority determination method (3).

FIG. 11 is a table illustrating an example of the selection table of the selection unit updated by the determination unit of the first embodiment, which is an example of priority determination method (3).

FIG. 12 is a table illustrating an example of the priority table retained by the determination unit of the first embodiment, which is an example of priority determination method (4).

FIG. 13 is a table illustrating an example of the selection table of the selection unit updated by the determination unit of the first embodiment, which is an example of priority determination method (4).

FIG. 14 is a table illustrating an example of priority classifications in a case where priority determination methods (1), (2), and (3) are combined in the first embodiment.

FIG. 15 is a table illustrating an example of the priority table illustrating priorities set in accordance with the classifications illustrated in FIG. 14.

FIG. 16 is a table illustrating an example of the selection table of the selection unit updated by the determination unit on the basis of the priority table illustrated in FIG. 15.

DESCRIPTION OF EMBODIMENTS

To describe the invention further in detail, embodiments for carrying out the invention will be described below with reference to the accompanying drawings.

First Embodiment

Figure 1:
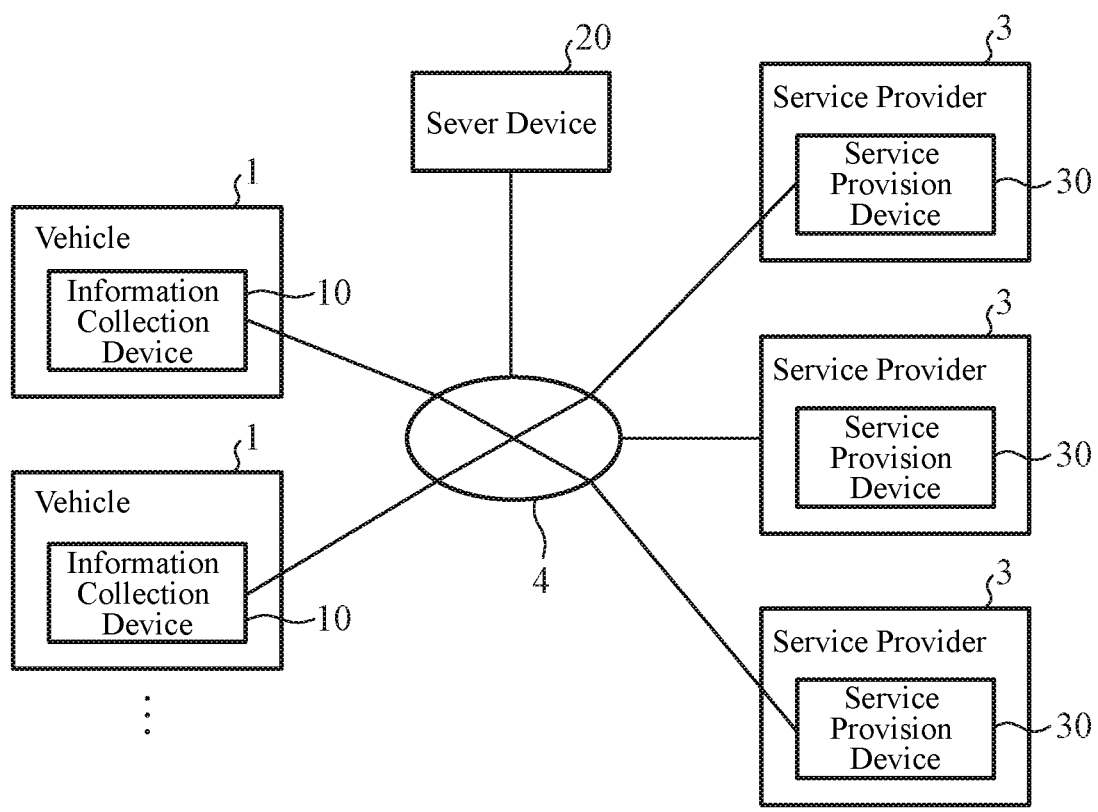
FIG. 1 is a block diagram illustrating an exemplary configuration of an information collection system according to a first embodiment.

FIG. 1 is a block diagram illustrating an exemplary configuration of an information collection system according to a first embodiment. In the information collection system illustrated in FIG. 1, a server device 20 stores information collected by information collection devices 10 mounted on vehicles 1, and service provision devices 30 of service providers 3 provide various services or functions to drivers of the vehicles 1 on the basis of a large amount of information accumulated in the server device 20. In the following, a service or function will be referred to as a "service or the like". The information collection devices 10, the server device 20, and the service provision devices 30 can communicate with each other through a network 4.

The information collection device 10 is mounted on the vehicle 1. The information collection device 10 transmits, to the server device 20, information selected from information acquired from sensors, an in-vehicle electronic control unit (ECU), and the like installed in the vehicle 1.

The server device 20 receives and stores the information transmitted by the information collection device 10. The server device 20 provides, to the service provision device 30 which will be described later, accumulated information or accumulated information that is used for provision of a service or the like. Note that the server device 20 may process or analyze the accumulated information, store the processed information, and provide the processed information to the service provision device 30.

The service provision device 30 is managed by the service provider 3. The service provision device 30 provides a service or the like to the drivers on the basis of the information accumulated in the server device 20. The service provider 3 may be a map company, a car insurance company, a car maintenance company that performs car maintenance, or the like.

The service provision device 30 of a map company generates information on spots where a driver should drive with caution while driving a vehicle (hereinafter, referred to as dangerous spot information), and provides the information to the driver. Hereinafter, a service or the like provided by a map company will be referred to as a dangerous spot information providing service. Note that a service provided by the service provision device 30 of the map company is not limited to the dangerous spot information providing service.

The service provision device 30 of a car insurance company calculates driving characteristics of a driver such as safety of driving on the basis of information such as the number of times of sudden braking and sudden steering, and provides car insurance at an insurance premium rate calculated on the basis of the driving characteristics. Hereinafter, a service or the like provided by a car insurance company will be referred to as an insurance premium calculation service.

The service provision device 30 of a car maintenance company diagnoses the location of a failure in a vehicle or predicts a failure, and notifies the driver when it is determined that a maintenance work is required. A service or the like provided by a car maintenance company will be referred to as a car diagnosis service.

In the first embodiment and a second embodiment described later, it is assumed that services or the likes provided from the service provision devices 30 of the service providers 3 are the dangerous spot information providing service, the insurance premium calculation service, and the car diagnosis service.

Figures 2, 3:
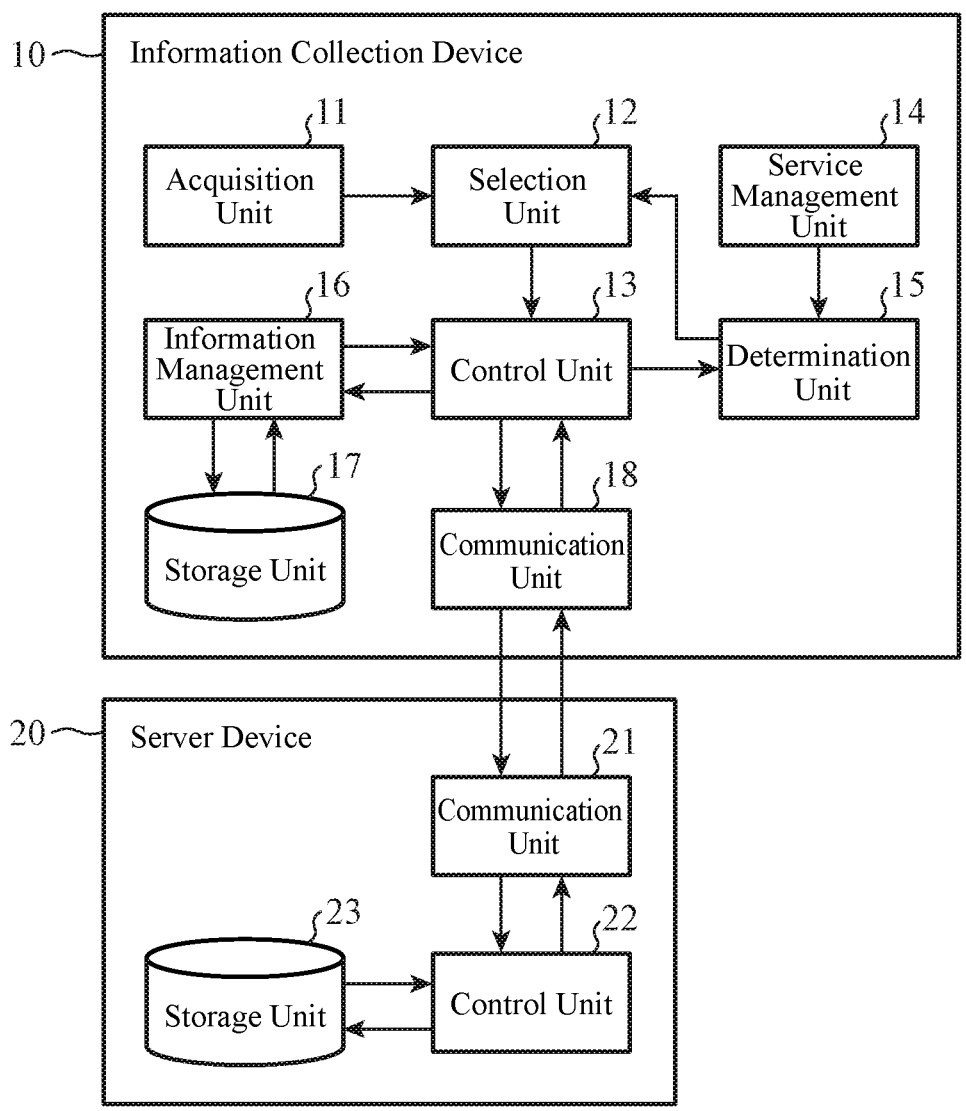
FIG. 2 is a block diagram illustrating an exemplary configuration of an information collection device and a server device according to the first embodiment.
FIG. 3 is a table illustrating an example of services or the likes registered in a service management unit of the first embodiment.

FIG. 2 is a block diagram illustrating an exemplary configuration of the information collection device 10 and the server device 20 according to the first embodiment.

The information collection device 10 transmits collected information to the server device 20 as described above. Here, the information collection device 10 transmits all the pieces of collected information to the server device 20 in a situation where the information collection device 10 can communicate with the server device 20. Meanwhile, in a situation where communication with the server device 20 cannot be performed, the information collection device 10 selects information to be transmitted to the server device 20 from among the collected information on the basis of, for example, a service or the like registered by the driver of the vehicle 1 and stores the selected information. The information collection device 10 transmits the stored information to the server device 20 when communication with the server device 20 becomes possible.

As illustrated in FIG. 2, the information collection device 10 includes an acquisition unit 11, a selection unit 12, a control unit 13, a service management unit 14, a determination unit 15, an information management unit 16, a storage unit 17, and a communication unit 18.

Hereinafter, each of the components will be described.

The acquisition unit 11 acquires vehicle information related to the vehicle 1, external environment information related to the external environment of the vehicle 1, in-vehicle environment information related to the internal environment of the vehicle 1, and driver information related to the driver of the vehicle 1 from sensors, an in-vehicle ECU, and the like installed in the vehicle 1, for example, via a controller area network (CAN).

Hereinafter, each of the pieces of information will be described.

Vehicle Information

Vehicle information is information related to a host vehicle and is acquired from an in-vehicle ECU or the like. The vehicle information includes the position of the host vehicle, the speed, the acceleration, the steering angle, the steering angular velocity, the accelerator opening, brake information, wiper information, direction indicator information, or the like.

The vehicle information may include vehicle analysis information obtained by processing or analyzing the vehicle information. The analysis information includes, for example, sudden deceleration spot information in which an acceleration equal to or less than a predetermined threshold value and the position of the host vehicle as of the time when the acceleration has been detected by the in-vehicle ECU are associated with each other, sudden acceleration spot information in which an acceleration equal to or greater than a predetermined threshold value and the position of the host vehicle as of the time when the acceleration has been detected by the in-vehicle ECU are associated with each other, or sudden steering spot information in which a steering angle equal to or greater than a predetermined threshold value and the position of the host vehicle as of the time when the steering angle has been detected by the in-vehicle ECU are associated with each other.

External Environment Information

External environment information is information acquired by external sensors installed to the vehicle 1 or information obtained by processing or analyzing the acquired information and the vehicle information (hereinafter, referred to as external environment analysis information).

The external environment information acquired by the external sensors includes an image capturing the outside of the vehicle such as an image of the vicinity of the vehicle 1 captured by a camera, information such as the position, the shape, the type, or the like of an object around the vehicle 1 detected by a millimeter wave radar, light detection and ranging (LiDER), or the like, the temperature outside the vehicle detected by a temperature sensor, the illuminance outside the vehicle detected by an illuminance sensor, etc.

The external environment analysis information includes the presence or absence or the type of a road sign, the type of an object around the vehicle 1, or the like obtained by analyzing the image capturing the outside of the vehicle.

The external sensors include a camera, a millimeter wave radar, LiDER, a sonar, a temperature sensor, an illuminance sensor, or the like.

In-Vehicle Environment Information

In-vehicle environment information is information acquired by in-vehicle sensors installed to the vehicle 1 or information obtained by processing or analyzing the acquired information (hereinafter, referred to as in-vehicle environment analysis information).

The in-vehicle environment information acquired by the in-vehicle sensors includes an image capturing the inside of the vehicle captured by a camera, the temperature inside the vehicle detected by a temperature sensor, an uttered speech of an occupant of the vehicle 1 or a noise detected by a microphone, or the like.

The in-vehicle environment analysis information includes the number of occupants, the arrangement of the occupants, or the presence or absence of a child seat obtained by analyzing the image capturing the inside of the vehicle, an uttered speech recognition result obtained by analyzing the uttered speech of the occupant, or the like. In addition, the in-vehicle environment analysis information may include driver information described below.

The in-vehicle sensors include a visible light camera, an infrared camera, a temperature sensor, a microphone, or the like.

Driver Information

Driver information includes biometric information of the driver of the vehicle 1, information indicating the physical condition of the driver, information indicating emotions of the driver, or information indicating the behavior of the driver obtained by analyzing the biometric information or an image capturing the driver, or the like.

For example, the biometric information of the driver is information indicating the heart rate, the body temperature, or the like. The information indicating the physical condition of the driver is information indicating a dead-man state in which the driver is unconscious due to illness or the like, a drowsiness degree, a careless state, or the like. The information indicating the behavior of the driver is information indicating a behavior such as inattentive driving, talking on a phone, or having a meal.

Note that, as described above, the driver information may be included in the in-vehicle environment analysis information.

In the service management unit 14, information related to a service or the like used by the driver out of the services or the likes provided from the service provision devices 30 on the basis of information accumulated in the server device 20 is registered. FIG. 3 is a table illustrating an example of services or the likes registered in the service management unit 14 of the first embodiment. For example, a unique ID is assigned to each of the services, and the service management unit 14 adds, updates, and deletes a service ID corresponding to the service or the like used by the driver.

The selection unit 12 selects information to be transmitted to the server device 20 from various types of information acquired by the acquisition unit 11. FIG. 4 is a table illustrating an example of a selection table retained by the selection unit 12 of the first embodiment. The selection table is a table in which information to be acquired by the acquisition unit 11 and the priority of the information are associated with each other. The selection unit 12 selects information to be transmitted to the server device 20 on the basis of the priorities in this selection table. In the first embodiment, the selection unit 12 preferentially selects information set with a relatively high priority value over information set with a relatively low priority value.

The priority of each piece of information in the selection table is updated on the basis of priorities determined by the determination unit 15 described later. That is to say, the selection unit 12 selects information to be transmitted to the server device 20 from various types of information acquired by the acquisition unit 11 on the basis of the priorities determined by the determination unit 15 described later. Details of the updating process of the priorities will be described later.

Note that the selection table illustrated in FIG. 4 is an example of the initial state and that the same priority is set for each piece of information. That is to say, in the initial state, the selection unit 12 selects all pieces of information acquired by the acquisition unit 11 as information to be transmitted to the server device 20.

In the first embodiment, description is given on the premise that the larger the priority value is, the higher the priority is, and that the selection unit 12 selects information having the highest priority; however, no limitation thereto is intended. For example, the selection unit 12 may give higher priority to a smaller priority value. Moreover, the selection unit 12 may select information of top N (N is any value) places in terms of priority.

The determination unit 15 determines the priority for information to be acquired by the acquisition unit 11 on the basis of a priority table retained in advance and the service or the like registered in the service management unit 14. Then, the determination unit 15 updates the selection table retained by the selection unit 12. Illustrated in FIG. 5 is an example of the priority table retained by the determination unit 15 of the first embodiment. The priority table is a table in which information acquired by the acquisition unit 11 and the priority of the information are set. For example, in the dangerous spot information providing service, information having a value larger than the priority "0" (host vehicle position, speed, acceleration, etc.) is information prioritized in the dangerous spot information providing service.

FIG. 6 is a table illustrating an example of the selection table of the selection unit 12 updated by the determination unit 15 of the first embodiment. The determination unit 15 acquires a service ID registered in the service management unit 14. Then, the determination unit 15 acquires priority values of the respective pieces of information set in the column of the acquired service ID from the priority table, and then updates the priorities of the respective pieces of information in the selection table retained by the selection unit 12. For example in a case where the service ID acquired by the determination unit 15 from the service management unit 14 is "01" only, the updated selection table is as illustrated in FIG. 6.

In a case where the determination unit 15 initializes the selection table, that is, in a case where information acquired by the acquisition unit 11 is to be entirely transmitted to the server device 20, the determination unit 15 updates the priority for each piece of the information in the selection table to "0".

Here, details of priority determination methods by the determination unit 15 will be described.

Priority Determination Method (1)

The determination unit 15 sets higher priority to information used for provision of the service or the like registered in the service management unit 14 as compared to the priority of information not used for provision of the service or the like registered in the service management unit 14.

For each service or the like, classification is made in advance between information used for provision of the service or the like and information not used for provision of the service or the like. That is to say, in the priority table retained by the determination unit 15, for each service or the like, a higher priority is set to information used for provision of the service or the like as compared to that of information not used for provision of the service or the like.

For example in a case where near-miss spots, spots with significantly uneven road surfaces, and the likes are provided as dangerous spot information to a driver in the dangerous spot information providing service, the service provision device 30 needs information related to spots where a large number of vehicles 1 have suddenly decelerated, spots where the vehicles 1 have made sharp turns, and spots where the vehicle bodies have significantly swung up and down in order to provide the above service. Therefore, in the priority table illustrated in FIG. 5, a high priority is set for the sudden deceleration spot information, the sudden steering spot information, and the uneven spot information generated on the basis of the vehicle information and the host vehicle position information described above.

In addition, a high priority is set for vehicle information such as the host vehicle position, the speed, the acceleration, the steering angle, and the brake information as information necessary for the server device 20 to analyze the dangerous spot information and the like in more detail. These pieces of vehicle information are targets for a process or analysis by the server device 20.

Furthermore, a high priority is set for the image capturing the outside of the vehicle, the uttered speech inside the vehicle, and the uttered speech recognition result as information necessary for grasping the situation outside the vehicle and of the driver when a near-miss occurs.

Here, let us assume a case where the driver has registered to use the dangerous spot information providing service, the insurance premium calculation service, and the car diagnosis service, that is, a case where the service or the like registered in the service management unit 14 is as illustrated in FIG. 3. In this case, the determination unit 15 sets a higher priority to information having value "1" in the columns of the respective service IDs in the priority table illustrated in FIG. 5 as compared to the priority of information having value "0". As a result, the determination unit 15 determines priorities of various types of information acquired by the acquisition unit 11 as illustrated in FIG. 7. Then, the determination unit 15 updates the selection table retained by the selection unit 12 on the basis of the determined priorities. FIG. 7 is a table illustrating an example of the selection table of the selection unit 12 updated by the determination unit 15 of the first embodiment.

Priority Determination Method (2)

The determination unit 15 determines a higher priority for information used for provision of a service or the like that provides information unique to the driver, among the services or the likes registered in the service management unit 14, as compared to the priority of information used for provision of a service or the like that provides information shared by multiple drivers.

Each service or the like is classified in advance into a service or the like that provides information unique to the driver or a service or the like that provides information shared by multiple drivers.

FIG. 8 is a table illustrating an example of the priority table retained by the determination unit 15 of the first embodiment. As illustrated in the priority table of FIG. 8, the priority of information used for provision of the insurance premium calculation service or the car diagnosis service is set to be higher than that of information used for provision of the dangerous spot information providing service.

For example, the service provision device 30 that provides the dangerous spot information providing service provides dangerous spot information having the same content to all drivers who are using the dangerous spot information providing service. That is to say, the dangerous spot information providing service is a service or the like that provides information shared by multiple drivers. Information used for provision of such service or the like does not need to be generated on the basis of information collected by the information collection device 10 of the vehicle 1 in which a specific driver is on board, and may be generated on the basis of information collected by the information collection device 10 of another vehicle.

On the other hand, the service provision device 30 that provides the insurance premium calculation service or the car diagnosis service separately provides information indicating the driving characteristics of the driver or the state of the vehicle to each driver. That is to say, the insurance premium calculation service and the car diagnosis service are services or the likes that provide information unique to the driver, and are services or the likes that provide information that cannot be shared with drivers of other vehicles. Information used for provision of such service or the like needs to be generated on the basis of information collected by the information collection device 10 of the host vehicle, and is not generated on the basis of information collected by the information collection device 10 of another vehicle.

Here, let us assume a case where the driver has registered to use the dangerous spot information providing service, the insurance premium calculation service, and the car diagnosis service, that is, a case where the service or the like registered in the service management unit 14 is as illustrated in FIG. 3. In this case, the determination unit 15 sets a higher priority to information having value "2" in the columns of the respective service IDs in the priority table illustrated in FIG. 8 as compared to the priority of information having value "1" or "0". In addition, the determination unit 15 sets a higher priority to information having value "1" in the columns of the respective service IDs in the priority table illustrated in FIG. 8 as compared to the priority of information having value "0". As a result, the determination unit 15 determines priorities of various types of information acquired by the acquisition unit 11 as illustrated in FIG. 9. Then, the determination unit 15 updates the selection table retained by the selection unit 12 on the basis of the determined priorities. FIG. 9 is a table illustrating an example of the selection table of the selection unit 12 updated by the determination unit 15 of the first embodiment.

Priority Determination Method (3)

The determination unit 15 determines a higher priority for information necessary for operation of a service or the like registered in the service management unit 14, among information used for provision of the service or the like, as compared to the priority of information necessary for quality improvement or value addition to the service or the like.

For each service or the like, classification is made in advance between information necessary for operation of the service or the like and information necessary for quality improvement or value addition to the service or the like.

FIG. 10 is a table illustrating an example of the priority table retained by the determination unit 15 of the first embodiment. For example, information necessary for operation of the dangerous spot information providing service includes uneven spot information, sudden deceleration spot information, and sudden steering spot information in the dangerous spot information providing service.

Meanwhile, information necessary for quality improvement or value addition to the dangerous spot information providing service includes the vehicle information of the host vehicle such as the host vehicle position, the speed, the acceleration, the steering angle, and the brake information, as well as an image capturing the outside of the vehicle indicating the situation when another vehicle has suddenly decelerated, an uttered speech, and an uttered speech recognition result. With the information necessary for quality improvement or value addition to the dangerous spot information providing service analyzed in more detail by the server device 20, for example, the dangerous spot information is made more accurate and enriched. Note that the amount of information necessary for quality improvement or value addition to the dangerous spot information providing service is large, and thus a lower priority is set thereto as compared to the information necessary for operation of the dangerous spot information providing service.

Here, let us assume a case where the driver has registered to use the dangerous spot information providing service, the insurance premium calculation service, and the car diagnosis service, that is, a case where the service or the like registered in the service management unit 14 is as illustrated in FIG. 3. In this case, the determination unit 15 determines priorities of various types of information acquired by the acquisition unit 11 as illustrated in FIG. 11 using the priority table illustrated in FIG. 10. Then, the determination unit 15 updates the selection table retained by the selection unit 12 on the basis of the determined priorities. FIG. 11 is a table illustrating an example of the selection table of the selection unit 12 updated by the determination unit 15 of the first embodiment.

Priority Determination Method (4)

The determination unit 15 determines a higher priority for analysis information obtained by processing or analyzing information acquired by the acquisition unit 11, among information used for provision of the service or the like registered in the service management unit 14, as compared to the priority of the information acquired by the acquisition unit 11.

The analysis information obtained by processing or analyzing information acquired by the acquisition unit 11 includes the above-described vehicle analysis information, the external environment analysis information, and the in-vehicle environment analysis information. The information acquired by the acquisition unit 11 includes the above-described vehicle information, the external environment information, and the in-vehicle environment information which are the sources of the analysis information. Note that the acquisition unit 11 may process or analyze information acquired by itself to generate analysis information, or may acquire analysis information generated by the in-vehicle ECU or the like mounted on the vehicle 1.

For each service or the like, classification is made in advance between analysis information and information which is the source of the analysis information.

FIG. 12 is a table illustrating an example of the priority table retained by the determination unit 15 of the first embodiment. For example, among information used for provision of the dangerous spot information providing service, analysis information includes uneven spot information, sudden deceleration spot information, and sudden steering spot information. As described above, these pieces of analysis information are obtained by associating the host vehicle positions when a vertical acceleration, a horizontal acceleration, and an angular acceleration exceed the respective predetermined threshold values with these accelerations and the angular acceleration. The amount of analysis information is smaller than that of vehicle information such as the host vehicle position and the acceleration, the vehicle information being the information as the source of the analysis information, since the number of pieces of the analysis information is small. Likewise, an uttered speech recognition result is analysis information obtained by analyzing an uttered speech, and represents the speech content using a character string, and thus the uttered speech recognition result has an information amount smaller than that of the uttered speech which is the information as the source of the analysis information. As described above, since the analysis information has a smaller information amount than the information as the source of the analysis information, a higher priority is set to the analysis information as compared to the priority of the information as the source of the analysis information.

Here, let us assume a case where the driver has registered to use the dangerous spot information providing service, the insurance premium calculation service, and the car diagnosis service, that is, a case where the service or the like registered in the service management unit 14 is as illustrated in FIG. 3. In this case, the determination unit 15 determines priorities of various types of information acquired by the acquisition unit 11 as illustrated in FIG. 13 using the priority table illustrated in FIG. 12. Then, the determination unit 15 updates the selection table retained by the selection unit 12 on the basis of the determined priorities. FIG. 13 is a table illustrating an example of the selection table of the selection unit 12 updated by the determination unit 15 of the first embodiment.

The above-described priority determination methods (2), (3), and (4) are obtained by combining the classification of priority determination method (1) and another classification, and are thus based on priority determination method (1). Note that two or more classifications may be combined with the classification of priority determination method (1). For example, the classification of priority determination method (2) and the classification of priority determination method (3) may be combined with the classification of priority determination method (1).

Illustrated in FIG. 14 is an example of priority classifications in a case where priority determination methods (1), (2), and (3) are combined in the first embodiment. Information of "registered" in "service registration" in FIG. 14 is information used for provision of the service or the like registered in the service management unit 14, and is determined on the basis of the classification of priority determination method (1). Information of "not shared" in "sharing of provided information with other vehicles" in FIG. 14 is information used for provision of a service or the like that provides information unique to the driver, and is determined on the basis of the classification of priority determination method (2); information of "shared" is information used for provision of a service or the like that provides information shared by multiple drivers. Information of "necessary" in "service operation" in FIG. 14 is information necessary for the operation of a service or the like, and is determined on the basis of the classification of priority determination method (3); information of "not necessary" is information necessary for quality improvement or value addition to the service or the like. With these classifications illustrated in FIG. 14 combined, a priority of "4", "3", "2", or "1" is set for various types of information. FIG. 15 is a table illustrating an example of the priority table illustrating priorities set in accordance with the classifications illustrated in FIG. 14. In a case where the service or the like registered in the service management unit 14 is as illustrated in FIG. 3, the determination unit 15 determines priorities of various types of information acquired by the acquisition unit 11 as illustrated in FIG. 16 using the priority table illustrated in FIG. 15. FIG. 16 is a table illustrating an example of the selection table of the selection unit 12 updated by the determination unit 15 on the basis of the priority table illustrated in FIG. 15.

The information management unit 16 stores information output from the control unit 13 in the storage unit 17 in response to an instruction from the control unit 13. The information management unit 16 also reads information stored in the storage unit 17 and outputs the information to the control unit 13 in response to an instruction from the control unit 13.

The communication unit 18 transmits information acquired from the control unit 13 to the server device 20. The communication unit 18 also receives information transmitted by the server device 20 and outputs the information to the control unit 13.

When information transmission to the server device 20 can be performed, the control unit 13 outputs information acquired from the selection unit 12 to the communication unit 18. On the other hand, when information transmission to the server device 20 cannot be performed, the control unit 13 outputs information acquired from the selection unit 12 to the information management unit 16 and instructs the information management unit 16 to store the information in the storage unit 17.

In addition, the control unit 13 instructs the information management unit 16 to read out the information stored in the storage unit 17 when information transmission to the server device 20 becomes possible from an uncommunicable state. Then, the control unit 13 acquires the information that the information management unit 16 has read from the storage unit 17 from the information management unit 16 and outputs the information to the communication unit 18.

The control unit 13 further instructs the determination unit 15 to determine priorities on the basis of the service or the like registered in the service management unit 14 when information transmission to the server device 20 becomes disabled from a communicable state.

The control unit 13 determines whether or not information transmission to the server device 20 can be performed, for example, on the basis of a result of communication with the server device 20. For example, the control unit 13 determines that information transmission to the server device 20 can be performed in a case where the communication unit 18 has been caused to transmit information to the server device 20, and the communication unit 18 receives a response from the server device 20 indicating that the information has been received. On the other hand, the control unit 13 determines that information transmission to the server device 20 cannot be performed in a case where the communication unit 18 has been caused to transmit information to the server device 20, however, the communication unit 18 cannot receive a response from the server device 20 indicating that the information has been received.

As illustrated in FIG. 2, the server device 20 includes a communication unit 21, a control unit 22, and a storage unit 23. The communication unit 21 communicates with the information collection device 10 mounted on the vehicle 1 and the service provision device 30 of the service provider 3. When the communication unit 21 receives information from the information collection device 10, the control unit 22 instructs the communication unit 21 to respond to the information collection device 10 and causes the storage unit 23 to store the information received by the communication unit 21. Then, the control unit 22 reads information stored in the storage unit 23 and instructs the communication unit 21 to transmit the read information to the service provision device 30 (not illustrated). Note that the control unit 22 may process or analyze the information to be transmitted to the service provision device 30.

Next, the operation of the information collection device 10 according to the first embodiment will be described.

Figure 17:
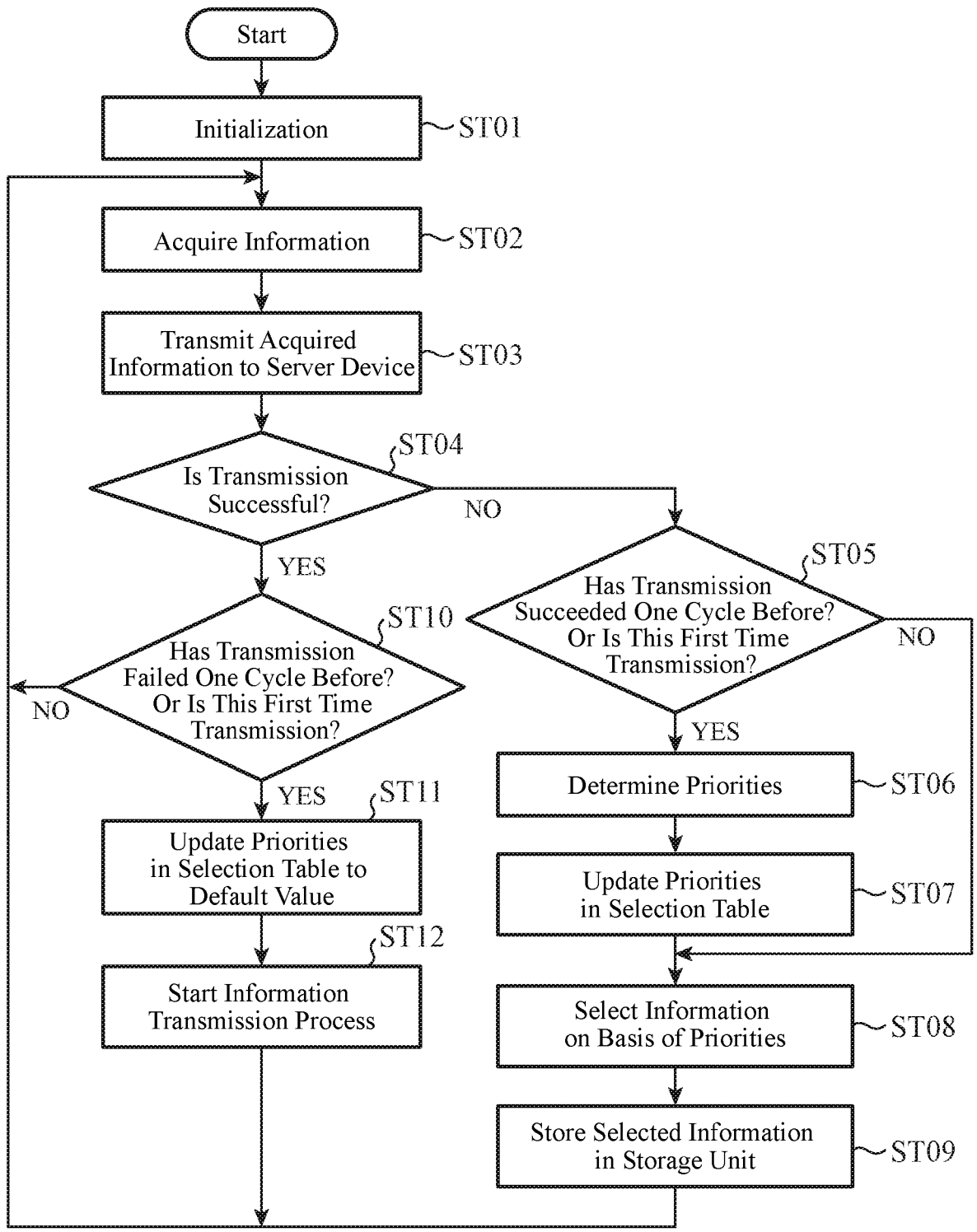
FIG. 17 is a flowchart illustrating exemplary operation of the information collection device according to the first embodiment.

FIG. 17 is a flowchart illustrating exemplary operation of the information collection device 10 according to the first embodiment. The information collection device 10 executes the processes illustrated in the flowchart of FIG. 17 during operation. Note that it is assumed here that the service or the like registered in the service management unit 14 is as illustrated in FIG. 3. It is also assumed that the determination unit 15 determines priorities using priority determination method (1). Furthermore, it is assumed that the selection unit 12 selects all the information to be acquired by the acquisition unit 11 in a case where priorities for all information types are the same and that the selection unit 12 selects information with the highest priority in a case where the priorities are different.

In step ST01, the control unit 13 performs initialization. Specifically, the control unit 13 instructs the determination unit 15 to set priorities in the selection table retained by the selection unit 12 to the default value of "0". Having received the instruction, the determination unit 15 sets the priorities in the selection table retained by the selection unit 12 to the default value of "0".

In step ST02, the acquisition unit 11 acquires vehicle information, external environment information, in-vehicle environment information, and driver information from a CAN or the like and outputs the acquired various types of information to the control unit 13.

In step ST03, the control unit 13 instructs the communication unit 18 to transmit the various types of information acquired by the acquisition unit 11 to the server device 20. Having received the instruction, the communication unit 18 transmits the various types of information to the server device 20.

In step ST04, if the communication unit 18 receives a response indicating that the various types of information have been received from the server device 20 within a predetermined period of time, the communication unit 18 outputs information indicating that the transmission has been successful to the control unit 13 ("YES" in step ST04). If the control unit 13 receives the information indicating that the transmission has been successful from the communication unit 18, the control unit 13 proceeds to step ST10. On the other hand, if the communication unit 18 cannot receive a response indicating that the various types of information have been received from the server device 20 within the predetermined period of time, the communication unit 18 outputs information indicating that the transmission has failed to the control unit 13 ("NO" in step ST04). If the control unit 13 receives the information indicating that the transmission has failed from the communication unit 18, the control unit 13 proceeds to step ST05.

In step ST05, if the transmission has failed in step ST04 in the current cycle, but the transmission has been successful in step ST04 one cycle before ("YES" in step ST05), the control unit 13 proceeds to step ST06. Note that the control unit 13 manages whether the transmission one cycle before has been successful or failed using, for example, a flag. On the other hand, if the transmission has failed in step ST04 in the current cycle, and the transmission has failed in step ST04 one cycle before as well ("NO" in step ST05), the control unit 13 proceeds to step ST08 since it is not necessary to perform determination of priorities and update of the selection table again.

Furthermore, in step ST05, the control unit 13 proceeds to step ST06 also in a case where the information transmission is performed for the first time, that is, in a case where there is no result indicating success or failure of transmission of one cycle before ("YES" in step ST05).

In step ST06, the control unit 13 instructs the determination unit 15 to determine priorities since information transmission to the server device 20 cannot be performed. Having received the instruction, the determination unit 15 determines priorities of the various types of information acquired by the acquisition unit 11 on the basis of the service IDs registered in the service management unit 14 and the priority table illustrated in FIG. 5.

In step ST07, the determination unit 15 updates the selection table retained by the selection unit 12 as illustrated in FIG. 7 on the basis of the determined priorities.

In step ST08, the selection unit 12 uses the selection table illustrated in FIG. 7 to select, from the various types of information acquired by the acquisition unit 11, information which is to be transmitted to the server device 20 when information transmission to the server device 20 becomes possible and which is to be stored in the storage unit 23 until information transmission to the server device 20 becomes possible. As described above, the selection unit 12 selects all the information acquired by the acquisition unit 11 in a case where priorities for all the information types are the same, and the selection unit 12 selects information with the highest priority in a case where the priorities are different. The selection unit 12 outputs the selected information to the control unit 13.

In step ST09, the control unit 13 outputs the information acquired from the selection unit 12 to the information management unit 16 and instructs the information management unit 16 to store the information in the storage unit 17. The information management unit 16 that has received the instruction causes the storage unit 17 to store the information received from the control unit 13. Then, the control unit 13 returns to step ST02. Since the amount of information stored in the storage unit 17 is reduced due to selection by the selection unit 12, excessive use of the storage capacity of the storage unit 17 is suppressed.

In step ST10, the control unit 13 returns to step ST02 if the transmission has been successful in step ST04 in the current cycle and the transmission has been successful also in step ST04 one cycle before ("NO" in step ST10). On the other hand, the control unit 13 proceeds to step ST11 if the transmission has been successful in step ST04 in the current cycle but the transmission has failed in step ST04 one cycle before ("YES" in step ST10). If the transmission has been successful in step ST04 in the current cycle but the transmission has failed in step ST04 one cycle before ("YES" in step ST10), information which has failed to be transmitted is stored in the storage unit 17 by step ST09 one cycle before.

Furthermore, in step ST10, the control unit 13 proceeds to step ST11 also in a case where the information transmission is performed for the first time, that is, in a case where there is no result indicating success or failure of transmission of one cycle before ("YES" in step ST10).

In step ST11, the control unit 13 instructs the determination unit 15 to initialize the priorities in the selection table. Having received the instruction, the determination unit 15 updates the priorities in the selection table retained by the selection unit 12 to the default value of "0".

In step ST12, the control unit 13 receives the information stored in the storage unit 17 from the information management unit 16, and starts a transmission process of transmitting the information to the server device 20. After starting the transmission process, the control unit 13 returns to step ST02. Note that the transmission process is performed in parallel with the processes illustrated in the flowchart of FIG. 17. In addition, in the transmission process, the control unit 13 instructs the information management unit 16 to erase the information stored in the storage unit 17 from the storage unit 17 after transmitting the information.

When returning from step ST12 to step ST02, the information collection device 10 transmits all the pieces of information acquired by the acquisition unit 11 to the server device 20 on the basis of the selection table, in which the priorities are updated to the default value, and transmits the information stored in the storage unit 17. However, since the information stored in the storage unit 17 has less amount due to selection by the selection unit 12, occurrence of congestion on the communication path is suppressed.

Figure 18:
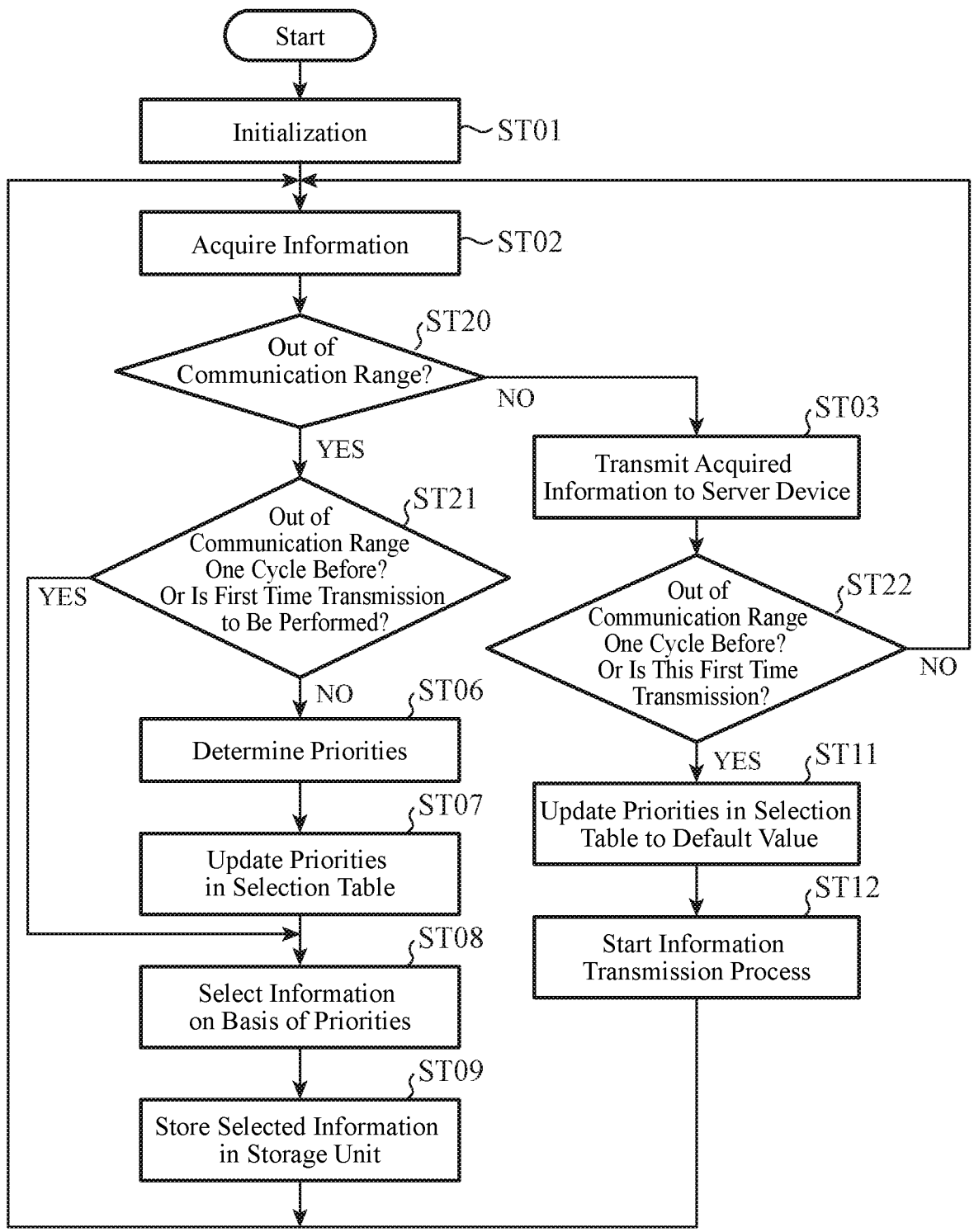
FIG. 18 is a flowchart illustrating other exemplary operation of the information collection device according to the first embodiment.

In the flowchart of FIG. 17, the control unit 13 determines whether or not information transmission to the server device 20 can be performed on the basis of whether the information selected by the selection unit 12 has been transmitted to the server device 20; however, the determination may be made by another method. For example in a case where the information collection device 10 can measure the radio field intensity, or in a case where the information collection device 10 can acquire information on the radio field intensity from a device mounted on the vehicle 1, the control unit 13 may determine whether or not information transmission to the server device 20 is possible on the basis of the radio field intensity. The operation of the information collection device 10 in this case is illustrated in the flowchart of FIG. 18. Here, it is assumed that the communication unit 18 measures the radio field intensity.

The processes of steps ST01 and ST02 in the flowchart of FIG. 18 are the same as the processes of steps ST01 and ST02 in the flowchart of FIG. 17.

In step ST20, the control unit 13 acquires the measurement result of the radio field intensity from the communication unit 18. If the control unit 13 determines that it is out of the communication range on the basis of the radio field intensity ("YES" in step ST20), the control unit 13 proceeds to step ST21. If it is determined that it is in the communication range ("NO" in step ST20), the control unit 13 proceeds to step ST03.

In step ST21, if it is out of the communication range in step ST20 in the current cycle and has also been out of the communication range in step ST20 one cycle before ("YES" in step ST21), the control unit 13 proceeds to step ST08. On the other hand, if it is out of the communication range in step ST20 in the current cycle but has been in the communication range in step ST20 one cycle before ("NO" in step ST21), the control unit 13 proceeds to step ST06.

Furthermore, in step ST21, the control unit 13 proceeds to step ST08 also in a case where the information transmission is to be performed for the first time, that is, in a case where there is no result indicating success or failure of transmission of one cycle before ("YES" in step ST21).

The processes of steps ST03 and ST06 to ST09 in the flowchart of FIG. 18 are the same as the processes of steps ST03 and ST06 to ST09 in the flowchart of FIG. 17.

In step ST22, if it is in the communication range in step ST20 in the current cycle but has been out of the communication range in step ST20 one cycle before ("YES" in step ST22), the control unit 13 proceeds to step ST11. On the other hand, if it is in the communication range in step ST20 in the current cycle and also has been in the communication range in step ST20 one cycle before ("NO" in step ST22), the control unit 13 returns to step ST02.

Furthermore, in step ST22, the control unit 13 proceeds to step ST11 also in a case where the information transmission is performed for the first time, that is, in a case where there is no result indicating success or failure of transmission of one cycle before ("YES" in step ST22).

The processes of steps ST11 and ST12 in the flowchart of FIG. 18 are the same as the processes of steps ST11 and ST12 in the flowchart of FIG. 17.

As described above, the information collection device 10 according to the first embodiment includes the acquisition unit 11, the determination unit 15, the selection unit 12, and the communication unit 18. The acquisition unit 11 acquires information related to the vehicle 1, information related to the environment inside and outside the vehicle 1, and information related to a driver on board the vehicle 1. The determination unit 15 determines priorities of the information acquired by the acquisition unit 11 on the basis of a service or the like used by the driver among services or the likes provided using information accumulated in the server device 20. The selection unit 12 selects information to be transmitted to the server device 20 from among the information acquired by the acquisition unit 11 on the basis of the priorities determined by the determination unit 15. The communication unit 18 transmits the information selected by the selection unit 12 to the server device 20. As a result, the information collection device 10 can transmit information necessary for provision of the service or the like used by the driver of the vehicle 1 to the server device 20, thereby preventing deterioration of the quality of the service or the like.

Note that the determination unit 15 of the first embodiment uses priority determination method (1), and thereby sets a higher priority to information used for provision of the service or the like used by the driver, among the services or the likes provided using the information accumulated in the server device 20, as compared to a priority of information not used for provision of the service or the like used by the driver. As a result, the information collection device 10 can select and transmit information so that the quality of the service or the like used by the driver does not deteriorate.

Moreover, the determination unit 15 of the first embodiment may use priority determination method (2), and thereby set, in information used for provision of services or the likes used by the driver, a higher priority to information used for provision of a service or the like that provides information unique to the driver, as compared to a priority of information used for provision of a service or the like that provides information shared by multiple drivers. The information used for provision of the service or the like that provides information shared by multiple drivers is transmitted, even in a case where the information collection device 10 of the host vehicle does not transmit the information used for provision of the service or the like, from the information collection device 10 of another vehicle. Therefore, the quality of the service or the like used by the driver does not deteriorate even in a case where the information is not transmitted from the information collection device 10 of the host vehicle to the server device 20.

Furthermore, the determination unit 15 of the first embodiment may use priority determination method (3), and thereby set, in information used for provision of the service or the like used by the driver, a higher priority to information necessary for operation of the service or the like used by the driver, as compared to a priority of information necessary for quality improvement or value addition to the service or the like used by the driver. Since the information collection device 10 transmits the information necessary for operation of the service or the like used by the driver to the server device 20, the quality of the service or the like used by the driver is maintained and does not deteriorate.

In addition, the determination unit 15 of the first embodiment may use priority determination method (4), and thereby set, in information used for provision of the service or the like used by the driver, a higher priority to analysis information obtained by processing or analyzing at least one of information related to the vehicle 1, information related to the environment inside and outside the vehicle 1, and information related to the driver on board the vehicle 1, as compared to a priority of information that is a source of the analysis information. The amount of the analysis information is smaller than the amount of the information that is the source of the analysis information. Therefore, the information collection device 10 can preferentially select information having a small information amount when selecting information so that the quality of the service or the like used by the driver does not deteriorate.

Moreover, the information collection device 10 according to the first embodiment includes the storage unit 17 for storing information selected by the selection unit 12 in a situation where communication between the communication unit 18 and the server device 20 cannot be performed. The communication unit 18 transmits the information stored in the storage unit 17 to the server device 20 when communication with the server device 20 becomes possible from an uncommunicable state. Since the information collection device 10 stores the information selected by the selection unit 12, it is possible to prevent the amount of information to be transmitted to the server device 20 form exceeding the storage capacity of the storage unit 17 when a situation lasts long where information transmission to the server device 20 cannot be performed.

Second Embodiment

Figure 19:
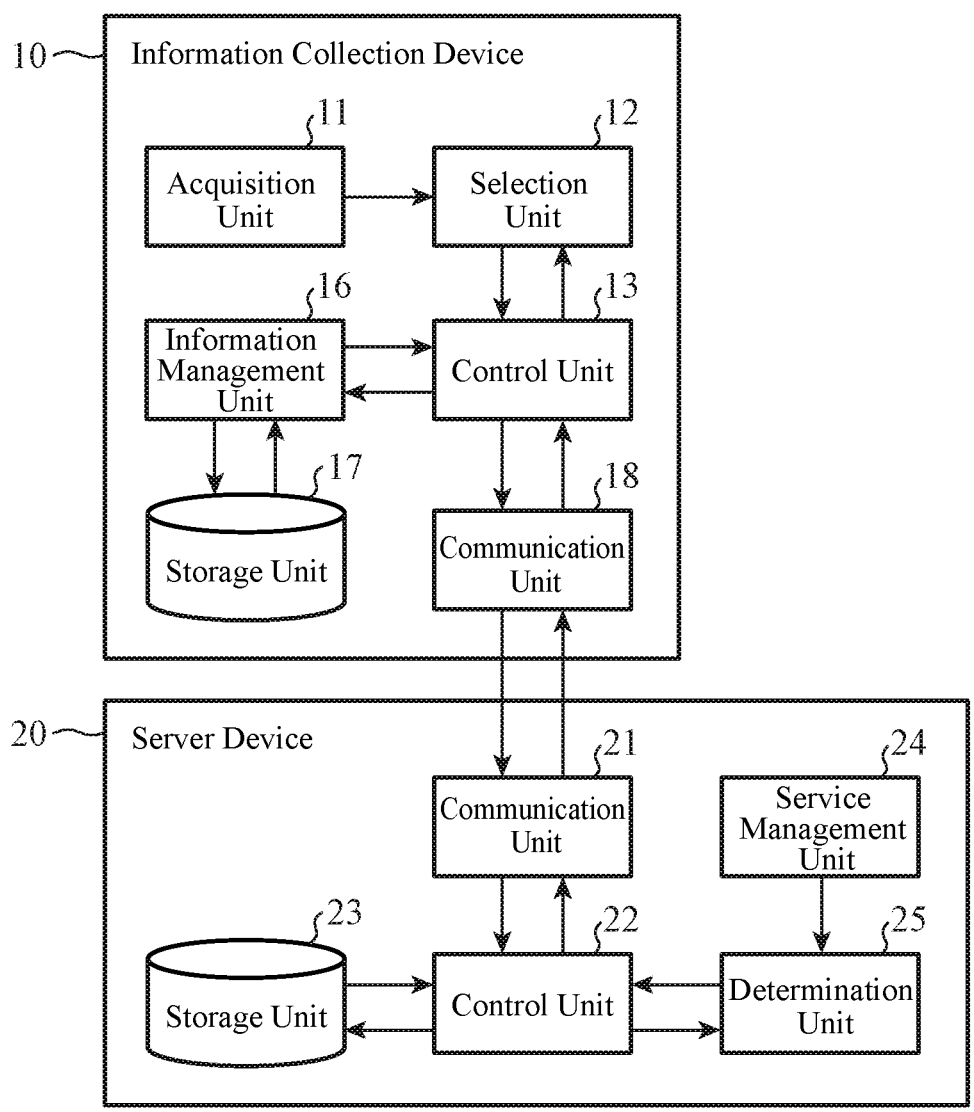
FIG. 19 is a block diagram illustrating an exemplary configuration of an information collection device and a server device according to a second embodiment.

FIG. 19 is a block diagram illustrating an exemplary configuration of an information collection device 10 and a server device 20 according to a second embodiment. The information collection device 10 according to the second embodiment corresponds to the information collection device 10 of the first embodiment illustrated in FIG. 2 without the service management unit 14 nor the determination unit 15. The server device 20 according to the second embodiment has a configuration in which a service management unit 24 and a determination unit 25 are added to the server device 20 of the first embodiment illustrated in FIG. 2. In FIG. 19, parts which are the same as or corresponding to those in FIG. 2 are denoted by the same symbols and description thereof is omitted. The configuration of an information collection system according to the second embodiment is the same as the configuration illustrated in FIG. 1 of the first embodiment in the drawings, and thus FIG. 1 is referred to hereinbelow.

In the first embodiment, the information collection device 10 determines whether or not communication with the server device 20 is possible, and the information collection device 10 determines priorities of information and updates the selection table in a case where the communication is not possible. On the other hand, in the second embodiment, the server device 20 determines priorities of information on the basis of a service or the like registered by the driver of a vehicle 1. Then, the server device 20 transmits information indicating the determined priorities to the information collection device 10. When the information collection device 10 receives the information indicating the priorities from the server device 20, the information collection device 10 updates a selection table on the basis of the information indicating the priorities.

Here, in the second embodiment, in a case where the server device 20 determines that the server device 20 is unable to process a large amount of information received from the information collection device 10, that is, in a case where the server device 20 determines that a processor for information processing (processor 201 illustrated in FIG. 24 described later) has insufficient resources, the server device 20 determines priorities in order to limit the amount of information transmitted to the server device 20, and transmits both information indicating the priorities and a request for information transmission limitation to the information collection device 10. The determination unit 25 determines priorities. Like the determination unit 15, the determination unit 25 is only required to determine priorities using at least one of priority determination methods (1) to (4). The service management unit 24 manages, for each information collection device 10 mounted on the corresponding vehicle 1, information on a service or the like used by a driver of the vehicle 1.

Note that the information transmission limitation includes at least one of prohibiting information transmission from the information collection device 10 and reducing the amount of information transmitted from the information collection device 10.

The control unit 22 determines whether or not to request the information collection device 10 to limit information transmission. For example, the control unit 22 measures the processing load of information processing in the server device 20, and determines to request the information collection device 10 to limit information transmission when the processing load becomes equal to or greater than a predetermined threshold value. The processing load is, for example, the usage rate of the processor or the usage rate of a memory (memory 202 illustrated in FIG. 24 described later).

Next, the operation of the information collection device 10 and the server device 20 according to the second embodiment will be described.

Figure 20:
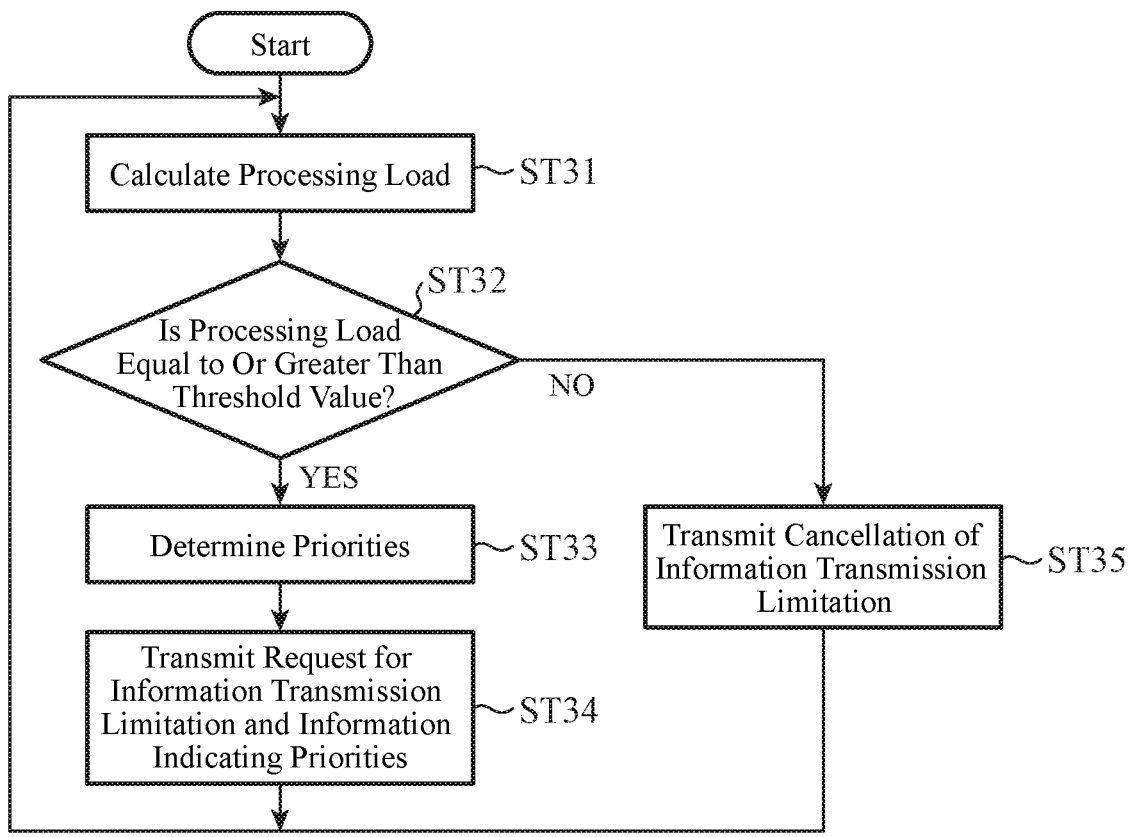
FIG. 20 is a flowchart illustrating an example of priority determination operation by the server device according to the second embodiment.

FIG. 20 is a flowchart illustrating an example of priority determination operation by the server device 20 according to the second embodiment. The control unit 22 determines to request the information collection device 10 to limit information transmission for example when the usage rate of the processor is equal to or greater than the predetermined threshold value (e.g. 90%).

In step ST31, the control unit 22 calculates the usage rate of the processor of the server device 20.

In step ST32, the control unit 22 determines whether or not the calculated processor usage rate is equal to or greater than the predetermined threshold value. If the processor usage rate is equal to or greater than the predetermined threshold value ("YES" in step ST32), the control unit 22 proceeds to step ST33, and if the processor usage rate is lower than the predetermined threshold value ("NO" in step ST32), the control unit 22 proceeds to step ST35.

In step ST33, the control unit 22 instructs the determination unit 25 to determine priorities for various types of information. Having received the instruction, the determination unit 25 determines priorities of the various types of information for each information collection device 10 using the priority table and information on a service or the like for the information collection device 10 registered in the service management unit 24. The determination unit 25 outputs information indicating the determined priorities to the control unit 22.

In step ST34, the control unit 22 acquires the information indicating the priorities from the determination unit 25, and instructs the communication unit 21 to transmit both the information indicating the priorities and a request signal requesting the information transmission limitation to each information collection device 10. Having received the instruction, the communication unit 21 transmits both the information indicating the priorities and the request signal for the information transmission limitation to each information collection device 10.

In step ST35, the control unit 22 instructs the communication unit 21 to transmit a cancellation signal for canceling the information transmission limitation to each information collection device 10. Having received the instruction, the communication unit 21 transmits the cancellation signal for the information transmission limitation to each information collection device 10.

Figure 21:
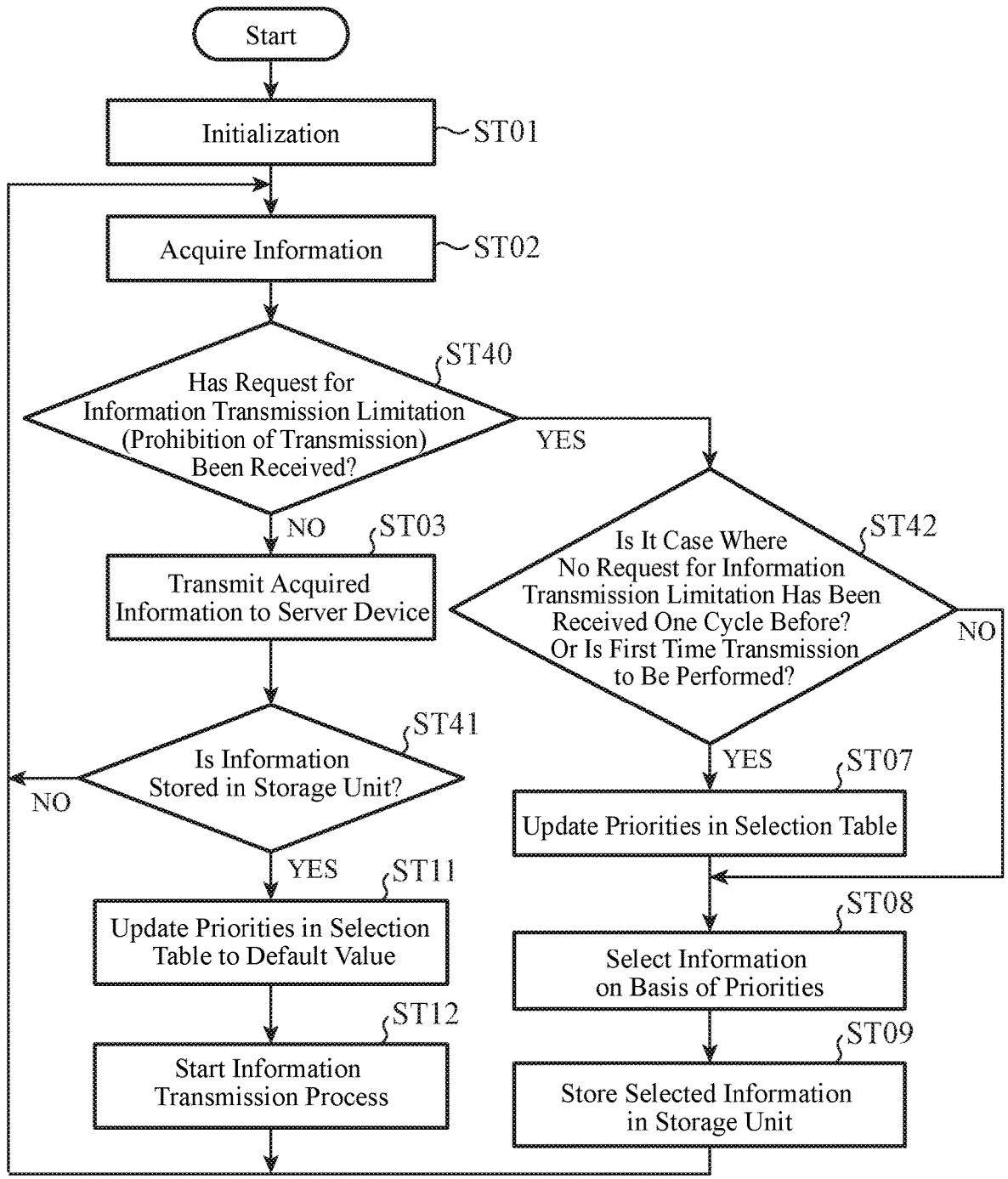
FIG. 21 is a flowchart illustrating exemplary operation of the information collection device according to the second embodiment.
Figure 22:
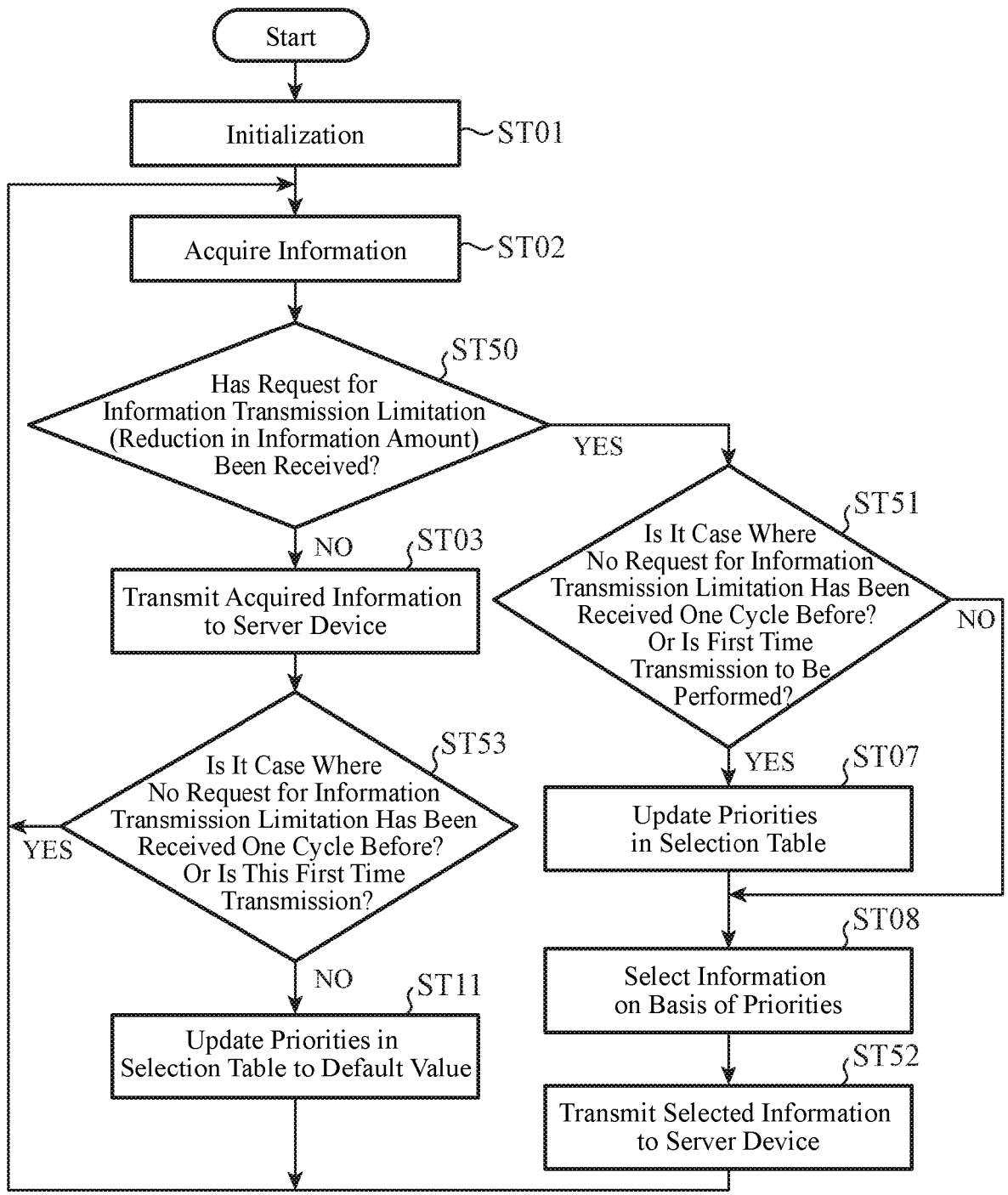
FIG. 22 is a flowchart illustrating other exemplary operation of the information collection device according to the second embodiment.

FIGS. 21 and 22 are flowcharts each illustrating exemplary operation of the information collection device 10 according to the second embodiment. The flowchart illustrated in FIG. 21 is exemplary operation in a case where the information transmission limitation is for prohibiting information transmission from the information collection device 10. Meanwhile, the flowchart illustrated in FIG. 22 is exemplary operation in a case where the information transmission limitation is for reducing the amount of information transmitted from the information collection device 10.

First, the operation illustrated in the flowchart of FIG. 21 will be described.

The processes of steps ST01 and ST02 in the flowchart of FIG. 21 are the same as the processes of steps ST01 and ST02 in the flowchart of FIG. 17.

In step ST40, if the communication unit 18 receives a request signal for information transmission limitation requesting to prohibit information transmission, which is transmitted by the server device 20, the control unit 13 determines that the request for information transmission limitation has been received ("YES" in step ST40) and proceeds to step ST42. On the other hand, if the communication unit 18 has not received a request signal for information transmission limitation, or if the communication unit 18 receives a cancellation signal for information transmission limitation transmitted by the server device 20, the control unit 13 determines that no request for information transmission limitation has been received ("NO" in step ST40) and proceeds to step ST03.

In step ST42, if it is a case where no request for information transmission limitation has been received one cycle before ("YES" in step ST42), or if the information transmission is to be performed for the first time since there is no result indicating success or failure of transmission of one cycle before ("YES" in step ST42), the control unit 13 proceeds to step ST07, and in other cases ("NO" in step ST42), the control unit 13 proceeds to step ST08.

The processes of steps ST03 and ST07 to ST09 in the flowchart of FIG. 21 are the same as the processes of steps ST03 and ST07 to ST09 in the flowchart of FIG. 17. Note that the determination unit 15 updates the selection table retained by the selection unit 12 on the basis of the priorities determined by the determination unit 15 itself in step ST07 in FIG. 17; however, in step ST07 in FIG. 21, the selection unit 12 updates the selection table on the basis of the information indicating the priorities received from the server device 20.

In step ST41, the control unit 13 instructs the information management unit 16 to confirm whether or not information is stored in the storage unit 17. Having received the instruction, the information management unit 16 confirms whether or not information is stored in the storage unit 17, and transmits the confirmation result to the control unit 13. In a case where information is stored in the storage unit 17, the information management unit 16 reads the information from the storage unit 17 and outputs the information to the control unit 13. The information stored in the storage unit 17 is information stored in the storage unit 17 in step ST09 in a cycle prior to the current cycle. If information is stored in the storage unit 17 ("YES" in step ST41), the control unit 13 proceeds to step ST11, and if no information is stored in the storage unit 17 ("NO" in step ST41), the control unit 13 returns to step ST02.

As described above, in a case where the server device 20 transmits, to the information collection device 10, a request signal for information transmission limitation to prohibit information transmission, the information collection device 10 does not transmit the information acquired by the acquisition unit 11 to the server device 20 but stores the information in the storage unit 17. The information stored in the storage unit 17 is transmitted to the server device 20 after the information transmission limitation for prohibiting information transmission is canceled.

The processes of steps ST11 and ST12 in the flowchart of FIG. 21 are the same as the processes of steps ST11 and ST12 in the flowchart of FIG. 17.

Next, the operation illustrated in the flowchart of FIG. 22 will be described.

The processes of steps ST01 and ST02 in the flowchart of FIG. 22 are the same as the processes of steps ST01 and ST02 in the flowchart of FIG. 17.

In step ST50, if the communication unit 18 receives a request signal for information transmission limitation requesting to reduce the information amount, which is transmitted by the server device 20, the control unit 13 determines that the request for information transmission limitation has been received ("YES" in step ST50) and proceeds to step ST51. On the other hand, if the communication unit 18 has not received a request signal for information transmission limitation, or if the communication unit 18 receives a cancellation signal for information transmission limitation transmitted by the server device 20, the control unit 13 determines that no request for information transmission limitation has been received ("NO" in step ST50) and proceeds to step ST03.

In step ST51, if it is a case where no request for information transmission limitation has been received one cycle before ("YES" in step ST51), or if the information transmission is to be performed for the first time since there is no result indicating success or failure of transmission of one cycle before ("YES" in step ST51), the control unit 13 proceeds to step ST07, and in other cases ("NO" in step ST51), the control unit 13 proceeds to step ST08.

The processes of steps ST03, ST07, ST08, and ST11 in the flowchart of FIG. 22 are the same as the processes of ST03, ST07, ST08, and ST11 in the flowchart of FIG. 17. Note that the determination unit 15 updates the selection table retained by the selection unit 12 on the basis of the priorities determined by the determination unit 15 itself in step ST07 in FIG. 17; however, in step ST07 in FIG. 22, the selection unit 12 updates the selection table on the basis of the information indicating the priorities received from the server device 20.

In step ST52, the control unit 13 acquires the information selected by the selection unit 12 in step ST08 from the selection unit 12. Then, the control unit 13 instructs the communication unit 18 to transmit the information acquired from the selection unit 12 to the server device 20. Having received the instruction, the communication unit 18 transmits the information acquired from the control unit 13 to the server device 20.

In step ST53, if it is a case where no request for information transmission limitation has been received one cycle before ("YES" in step ST53), or if the information transmission is performed for the first time since there is no result indicating success or failure of transmission of one cycle before ("YES" in step ST53), the control unit 13 returns to step ST02, and in other cases ("NO" in step ST53), the control unit 13 proceeds to step ST11.

As described above, in a case where the server device 20 transmits a request signal for information transmission limitation to reduce the information amount to the information collection device 10, the information collection device 10 transmits information having a high priority among the information acquired by the acquisition unit 11, to the server device 20.

As described above, the server device 20 according to the second embodiment includes the communication unit 21 and the determination unit 25. The communication unit 21 transmits, to the vehicle 1, information indicating priorities of information to be transmitted to the server device 20, and receives, from the vehicle 1, information related to the vehicle 1, information related to the environment inside and outside the vehicle 1, and information related to the driver on board the vehicle 1 that are selected by the vehicle 1 on the basis of the priorities. The determination unit 25 determines the priorities of the information to be transmitted by the vehicle 1 on the basis of a service or function used by the driver among services or functions provided using information accumulated in the storage unit 23 by the server device 20. As a result, the server device 20 can receive information necessary for provision of the service or the like used by the driver of the vehicle 1 from the vehicle 1, thereby preventing deterioration of the quality of the service or the like.

Finally, hardware configurations of the information collection device 10 and the server devices 20 according to the embodiments will be described.

Figure 23:
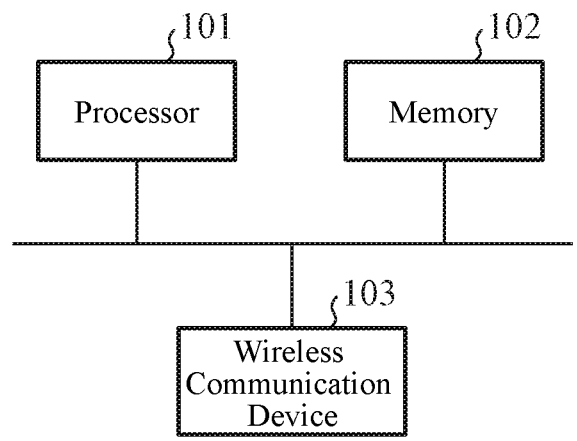
FIG. 23 is a diagram illustrating a hardware configuration example of the information collection devices according to the embodiments.

FIG. 23 is a diagram illustrating a hardware configuration example of the information collection devices 10 according to the embodiments. The storage unit 17 in the information collection device 10 corresponds to a memory 102. The communication unit 18 in the information collection device 10 corresponds to a wireless communication device 103. The functions of the acquisition unit 11, the selection unit 12, the control unit 13, the service management unit 14, the determination unit 15, and the information management unit 16 in the information collection device 10 are implemented by a processor 101 that executes a program stored in the memory 102.

The functions of the acquisition unit 11, the selection unit 12, the control unit 13, the service management unit 14, the determination unit 15, and the information management unit 16 are implemented by software, firmware, or a combination of software and firmware. The software or the firmware is described as a program, which is stored in the memory 102. The processor 101 reads and executes the program stored in the memory 102 and thereby implements the functions of the respective units. That is to say, the information collection device 10 includes the memory 102 for storing the program, execution of which by the processor 101 results in execution of the steps illustrated in the flowchart of FIG. 17 or other drawings. It can also be said that this program causes a computer to execute the procedures or methods of the acquisition unit 11, the selection unit 12, the control unit 13, the service management unit 14, the determination unit 15, and the information management unit 16.

Figure 24:
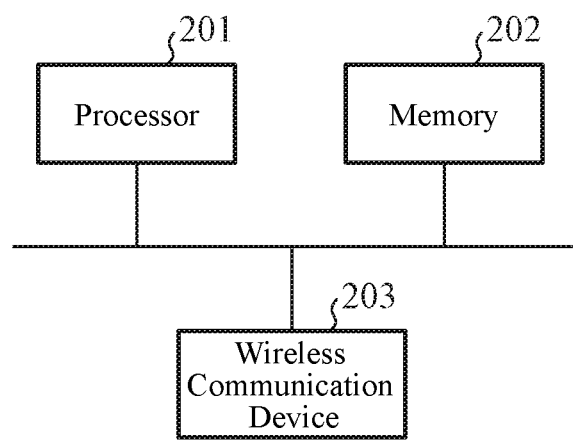
FIG. 24 is a diagram illustrating a hardware configuration example of the server devices according to the embodiments.

FIG. 24 is a diagram illustrating a hardware configuration example of the server devices 20 according to the embodiments. The storage unit 23 in the server device 20 corresponds to a memory 202. The communication unit 21 in the server device 20 corresponds to a wireless communication device 203. The functions of the control unit 22, the service management unit 24, and the determination unit 25 in the server device 20 are implemented by a processor 201 that executes a program stored in the memory 202.

The functions of the control unit 22, the service management unit 24, and the determination unit 25 are implemented by software, firmware, or a combination of software and firmware. The software or the firmware is described as a program, which is stored in the memory 202. The processor 201 reads and executes the program stored in the memory 202 and thereby implements the functions of the respective units. That is to say, the server device 20 includes the memory 202 for storing the program, execution of which by the processor 201 results in execution of the steps illustrated in the flowchart of FIG. 20 or other drawings. It can also be said that this program causes a computer to execute the procedures or methods of the control unit 22, the service management unit 24, and the determination unit 25.

Each of the processors 101 and 201 may be a central processing unit (CPU), a processing device, an arithmetic device, a microprocessor, or the like.

Each of the memories 102 and 202 may be a nonvolatile or volatile semiconductor memory such as a random access memory (RAM), a read only memory (ROM), an erasable programmable ROM (EPROM), or a flash memory, a magnetic disk such as a hard disk or a flexible disk, or an optical disk such as a compact disc (CD) or a digital versatile disc (DVD).

Note that the present invention may include a flexible combination of the embodiments, a modification of any component of the embodiments, or omission of any component in the embodiments within the scope of the present invention.

INDUSTRIAL APPLICABILITY

An information collection device according to the present invention is suitable for use as an information collection device or the like for collecting information related to a vehicle and transmitting the information to a server device.

REFERENCE SIGNS LIST

1: vehicle, 3: service provider, 4: network, 10: information collection device, 11: acquisition unit, 12: selection unit, 13: control unit, 14, 24: service management unit, 15, 25: determination unit, 16: information management unit, 17: storage unit, 18: communication unit, 20: server device, 21: communication unit, 22: control unit, 23: storage unit, 30: service provision device, 101, 201: processor, 102, 202: memory, 103, 203: wireless communication device

The invention claimed is:

1. An information collection device, comprising:
a processor to execute a program;
a memory to store the program which, when executed by the processor, performs processes comprising:
acquiring pieces of information including information related to a vehicle, information related to environment inside and outside the vehicle, and information related to a driver on board the vehicle,
determining priorities of the pieces of information acquired on a basis of one or more services or functions used by the driver among services or functions provided using information accumulated in a server device,
selecting a piece of information to be transmitted to the server device from among the pieces of information acquired on a basis of the priorities determined, and
storing, from among the pieces of information acquired, only the selected piece of information in the memory to efficiently use the memory; and
a wireless communicator configured to:
receive the selected piece of information from the memory, and
transmit the selected piece of information to the server device.

2. The information collection device according to claim 1, wherein the processes further include setting a higher priority to one or more pieces of information each of which is used for provision of a corresponding one of the services or functions used by the driver, among the services or functions provided using the information accumulated in the server device, as compared to a priority of a piece of information not used for provision of the services or functions used by the driver.

3. The information collection device according to claim 2, wherein the processes further include, in the pieces of information each of which is used for provision of a corresponding one of the services or functions used by the driver, setting a higher priority to a piece of information used for provision of a service or function that provides information unique to the driver, as compared to a priority of a piece of information used for provision of a service or function that provides information shared by multiple drivers.

4. The information collection device according to claim 2, wherein the processes further include, in the pieces of information each of which is used for provision of a corresponding one of the services or functions used by the driver, setting a higher priority to a piece of information necessary for operation of one of the services or functions used by the driver, as compared to a priority of a piece of information necessary for quality improvement or value addition to the one of the services or functions used by the driver.

5. The information collection device according to claim 2, wherein the processes further include, in the pieces of information each of which is used for provision of a corresponding one of the services or functions used by the driver, setting a higher priority to analysis information obtained by processing or analyzing at least one of the information related to the vehicle, the information related to the environment inside and outside the vehicle, and the information related to the driver on board the vehicle, as compared to a priority of information that is a source of the analysis information.

6. The information collection device according to claim 1, wherein
the wireless communicator only transmits the piece of information stored in the memory to the server device when communication with the server device becomes possible from an uncommunicable state.

7. An information collection device, comprising:
a processor to execute a program;
a memory to store the program which, when executed by the processor, performs processes comprising:
acquiring pieces of information including information related to a vehicle, information related to environment inside and outside the vehicle, and information related to a driver on board the vehicle,
selecting a piece of information to be transmitted to a server device from among the pieces of information acquired on a basis of priorities of the pieces of information, the priorities being determined by the server device on a basis of one or more services or functions used by the driver among services or functions provided using information accumulated in the server device;
storing, from among the pieces of information acquired, only the selected piece of information in the memory to efficiently use the memory; and
a wireless communicator configured to:
receive the selected piece of information from the memory, and
transmit the selected piece of information to the server device.

8. An information collection method, comprising:
acquiring pieces of information including information related to a vehicle, information related to environment inside and outside the vehicle, and information related to a driver on board the vehicle;
determining priorities of the pieces of information acquired on a basis of one or more services or functions used by the driver among services or functions provided using information accumulated in a server device;
selecting a piece of information to be transmitted to the server device from among the pieces of information acquired on a basis of the priorities determined;
storing, from among the pieces of information acquired, only the selected piece of information in a memory to efficiently use the memory;
receiving the selected piece of information from the memory; and
transmitting the selected piece of information to the server device.

9. The information collection device according to claim 1, wherein the selected information corresponds to a priority value in a table, the table is stored in the memory, the priority value in the table corresponds to a service, and the driver of the vehicle has registered for the service.

* * * * *